US009857138B2

(12) United States Patent
Geissele

(10) Patent No.: US 9,857,138 B2
(45) Date of Patent: Jan. 2, 2018

(54) BARREL INSTALLATION TOOL

(71) Applicant: WHG Properties, LLC, North Wales, PA (US)

(72) Inventor: William H. Geissele, Lower Gwynedd, PA (US)

(73) Assignee: WHG Properties, LLC, North Wales, PA (US)

( * ) Notice: Subject to any disclaimer, the term of this patent is extended or adjusted under 35 U.S.C. 154(b) by 0 days.

(21) Appl. No.: 15/019,605

(22) Filed: Feb. 9, 2016

(65) Prior Publication Data

US 2016/0161204 A1 Jun. 9, 2016

Related U.S. Application Data

(60) Division of application No. 14/221,512, filed on Mar. 21, 2014, which is a continuation-in-part of application No. 29/479,050, filed on Jan. 10, 2014, now Pat. No. Des. 718,103.

(51) Int. Cl.

| | |
|---|---|
| ***B23P 19/04*** | (2006.01) |
| ***F41A 21/48*** | (2006.01) |
| ***B25B 13/48*** | (2006.01) |
| ***B25B 13/04*** | (2006.01) |
| ***B25B 13/50*** | (2006.01) |
| ***F41A 11/00*** | (2006.01) |
| ***F41A 35/00*** | (2006.01) |

(52) U.S. Cl.

CPC .............. *F41A 21/48* (2013.01); *B25B 13/04* (2013.01); *B25B 13/48* (2013.01); *B25B 13/50* (2013.01); *F41A 11/00* (2013.01); *F41A 21/482* (2013.01); *F41A 35/00* (2013.01)

(58) Field of Classification Search

USPC ........................................................... 29/255

See application file for complete search history.

(56) References Cited

U.S. PATENT DOCUMENTS

| | | | | |
|---|---|---|---|---|
| 1,550,436 A | | 8/1925 | Hall | |
| 1,571,580 A | * | 2/1926 | Fishburn | B25B 13/04 7/100 |
| 3,277,569 A | | 10/1966 | Verhoeven | |
| 3,354,757 A | * | 11/1967 | Grimm | B25B 13/04 411/410 |
| 3,564,955 A | | 2/1971 | Batchelder | |
| 3,641,848 A | | 2/1972 | Franks | |

(Continued)

OTHER PUBLICATIONS

AR15 barrels.com at http://www.ar15barrels.com/data/barrel-nut-index.pdf (Nov. 2011).

*Primary Examiner* — Larry E Waggle, Jr.
*Assistant Examiner* — Alvin Grant
(74) *Attorney, Agent, or Firm* — Merchant & Gould, P.C.

(57) ABSTRACT

A barrel installation assembly is used for easily installing a barrel onto a receiver of a firearm with proper torque and alignment. The barrel installation assembly includes a barrel nut, barrel nut spacers, and a barrel installation tool. The barrel nut is configured to fasten the barrel to the receiver. The barrel nut spacers are configured to be interposed between the barrel nut and the receiver when the barrel is fastened thereto. The barrel installation tool includes a head portion configured to removably engage with the barrel nut, and a handle portion extending from the head portion.

14 Claims, 26 Drawing Sheets

(56) References Cited

U.S. PATENT DOCUMENTS

| | | | | |
|---|---|---|---|---|
| 3,807,028 | A | 4/1974 | DeLuca | |
| D274,973 | S | 8/1984 | Waller | |
| 4,901,411 | A | 2/1990 | Chestnut | |
| D329,788 | S | 9/1992 | Andrew | |
| 5,307,713 | A | 5/1994 | White | |
| 3,258,278 | A | 6/1996 | Miller, Jr. | |
| D379,053 | S | 5/1997 | Howard | |
| D417,372 | S | 12/1999 | Cachot | |
| 6,098,503 | A | 8/2000 | Hlinka | |
| D433,895 | S | 11/2000 | Kindel | |
| 6,230,430 | B1 | 5/2001 | Gosselin | |
| D464,239 | S | 10/2002 | Hamlin | |
| 6,505,532 | B1 | 1/2003 | Lawson | |
| 6,681,791 | B1 | 1/2004 | Chorney | |
| 6,698,315 | B1 * | 3/2004 | Wright | B25B 13/065 81/121.1 |
| D491,427 | S | 6/2004 | Weimer | |
| 6,745,648 | B2 | 6/2004 | Stier | |
| 6,745,649 | B1 | 6/2004 | Liao | |
| 6,971,202 | B2 | 12/2005 | Bender | |
| 7,140,275 | B1 | 11/2006 | Staples | |
| 7,174,667 | B2 | 2/2007 | Connal | |
| D548,552 | S | 8/2007 | Elkaim | |
| 7,290,466 | B1 | 11/2007 | Wadsley | |
| D564,316 | S * | 3/2008 | Elkaim | F41A 35/00 D22/199 |
| D584,585 | S | 1/2009 | Juelch et al. | |
| D601,393 | S * | 10/2009 | Cui | D8/17 |
| D666,883 | S | 9/2012 | Howard | |
| D682,643 | S | 5/2013 | Yang | |
| 8,479,429 | B2 | 7/2013 | Barrett et al. | |
| D703,502 | S * | 4/2014 | Cheng | D8/21 |
| D718,103 | S * | 11/2014 | Geissele | B25B 13/48 D8/17 |
| 8,887,655 | B2 | 11/2014 | Carlson | |
| D719,426 | S | 12/2014 | Whitehead | |
| 8,931,198 | B2 | 1/2015 | Aalto | |
| D725,221 | S | 3/2015 | Geissele | |
| D728,333 | S * | 5/2015 | Sui | D8/17 |
| 9,234,717 | B2 | 1/2016 | Jarboe | |
| 2002/0020955 | A1 | 2/2002 | Hass | |
| 2004/0060399 | A1 | 4/2004 | Willis | |
| 2006/0162224 | A1 | 7/2006 | Connal | |
| 2007/0033851 | A1 | 2/2007 | Hochstrate et al. | |
| 2008/0029745 | A1 | 2/2008 | Chartier | |
| 2012/0073177 | A1 | 3/2012 | Laney | |
| 2012/0125162 | A1 * | 5/2012 | Nguyen | B23B 31/201 81/124.4 |
| 2012/0291595 | A1 | 11/2012 | Hemesath | |
| 2014/0026459 | A1 | 1/2014 | Yan | |
| 2014/0033590 | A1 | 2/2014 | Gomez | |
| 2014/0075817 | A1 | 3/2014 | Gomez | |
| 2014/0115938 | A1 | 5/2014 | Jarboe | |
| 2014/0345179 | A1 | 11/2014 | Adair | |
| 2015/0198405 | A1 * | 7/2015 | Keng | F41A 35/00 42/108 |
| 2016/0054096 | A1 | 2/2016 | Dzwill | |
| 2016/0061238 | A1 | 3/2016 | Livingstone | |

* cited by examiner

114

SHIM SELECTION TABLE

| IDENTIFIER | SIZE |
|---|---|
| FIRST IDENTIFIER | .008 " |
| SECOND IDENTIFIER | .009 " |
| THRID IDENTIFIER | .010 " |
| FOURTH IDENTIFIER | .012 " |
| FIFTH IDENTIFIER | .015 " |

FIG. 8

BARREL INSTALLATION TOOL

CROSS-REFERENCE TO RELATED APPLICATION(S)

This application is a divisional of U.S. patent application Ser. No. 14/221,512 filed Mar. 21, 2014, which is a continuation-in-part of U.S. patent application Ser. No. 29/479,050 filed Jan. 10, 2014 (now U.S. Pat. No. D718,103), the disclosures of all of which are incorporated herein by reference in their entireties. To the extent appropriate, a claim of priority is made to each of the above-disclosed applications.

BACKGROUND

The barrel of a firearm is typically formed separate from the receiver. As a result, the firearm includes some feature that allows the barrel to be connected to the receiver. As one example, a rearward end of the barrel is threaded and configured to screw into a corresponding threaded receptacle of the receiver. As another example, a separate barrel nut is used. The barrel nut slides over the barrel and has a threaded end that is screwed onto a corresponding threaded portion of the receiver.

When the barrel is connected to the receiver using a barrel nut, it is important that the barrel nut is secured with a proper torque or tension. If overly tightened, the barrel nut may be difficult to remove and the nut, barrel, or receiver could be damaged. If under tightened, the barrel nut may loosen over time. Additionally, proper tightening of the barrel nut may be necessary in order for the various components of the firearm to be properly aligned.

SUMMARY

In general terms, this disclosure is directed to a barrel installation tool used for firearms. In one possible configuration and by non-limiting example, the barrel installation tool is employed to install a barrel onto a receiver of a firearm. Various aspects are described in this disclosure, which include, but are not limited to, the following aspects.

One aspect is a barrel installation tool for use in installing a barrel to a receiver of a firearm using a barrel nut to fasten the barrel to the receiver, the barrel installation tool comprising: a head portion configured to removably engage with the barrel nut; a handle portion connected to the head portion; and a barrel nut position indicating portion arranged on the head portion, wherein the barrel nut position indicating portion indicates an amount of rotation of the barrel nut required to properly align the barrel nut with the receiver.

Another aspect is a barrel installation assembly for installing a barrel onto a receiver of a firearm, the barrel installation assembly comprising: a barrel nut configured to fasten the barrel to the receiver; barrel nut spacers configured to be interposed between the barrel nut and the receiver; and a barrel installation tool for tightening the barrel nut onto the barrel and the receiver, the barrel installation tool comprising: a head portion configured to removably engage with the barrel nut; a handle portion extending from the head portion; and a barrel nut spacer selection portion including one or more barrel nut spacer selection indicators positioned on the head portion to identify one or more of the barrel nut spacers having a thickness to properly space the barrel nut from the receiver.

Yet another aspect is a method of installing a barrel to a receiver of a firearm, the method comprising: inserting the barrel into the receiver; fastening the barrel to the receiver with a barrel nut; engaging a barrel installation tool with the barrel nut so that the barrel installation tool is in a first tool position; and tightening the barrel nut using the barrel installation tool until the barrel installation tool is in a second tool position in which an indicator of the barrel installation tool is aligned to a reference point of the receiver to provide a first amount of torque between the barrel nut and the receiver and to align the barrel nut to the receiver.

BRIEF DESCRIPTION OF THE DRAWINGS

FIG. 8 illustrates an example barrel nut spacer selection table.

DETAILED DESCRIPTION

Figure 1:
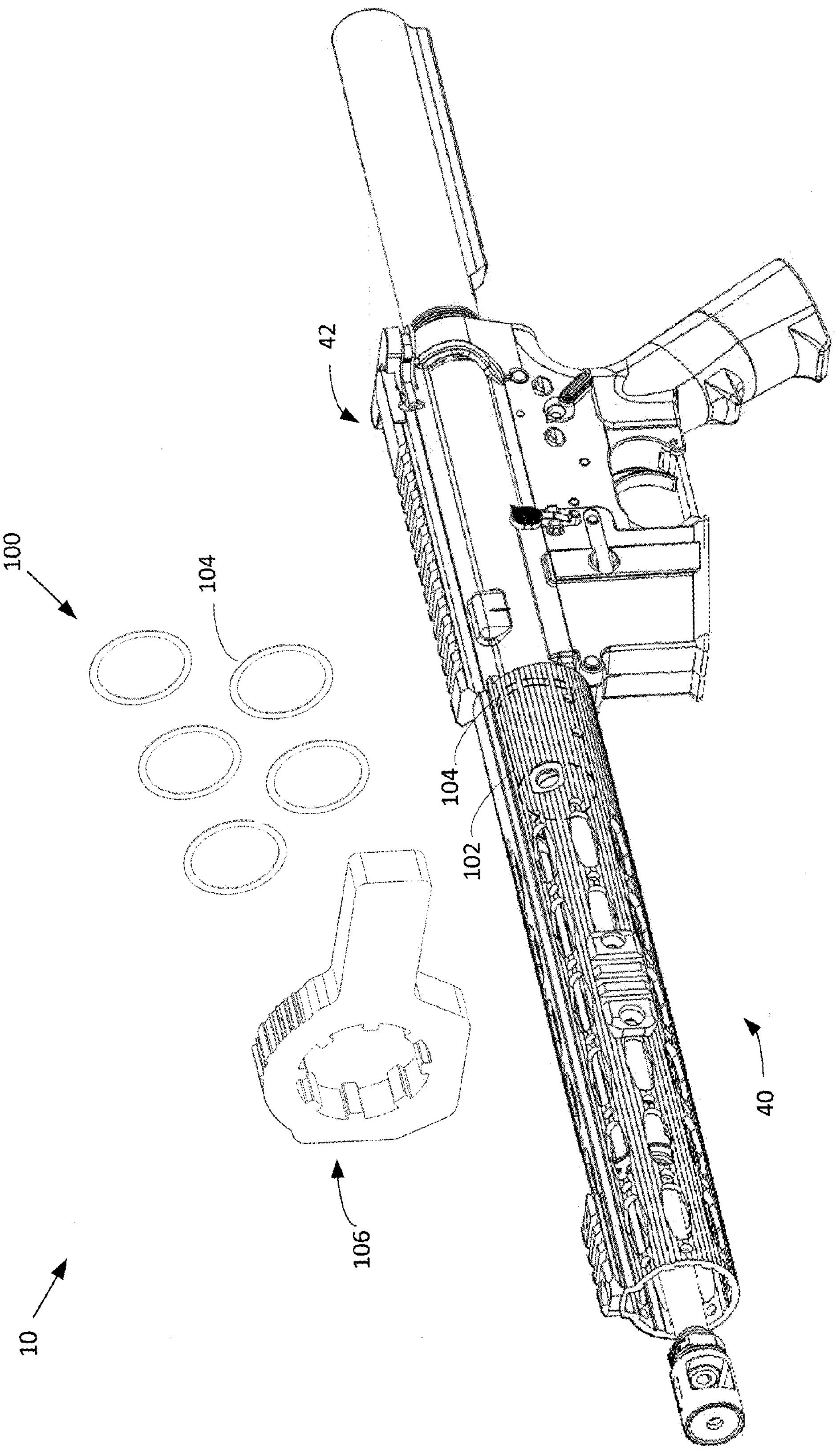
FIG. 1 is a perspective view illustrating an example firearm system.

Various embodiments are described herein in detail with reference to the drawings, wherein like reference numerals represent like parts and assemblies throughout the several views. Reference to various embodiments does not limit the scope of the appended claims. Additionally, any examples set forth in this specification are not intended to be limiting and merely set forth some of the many possible embodiments for the appended claims.

FIG. 1 is a perspective view illustrating an example firearm system 10. The firearm system 10 includes a firearm 40 and a barrel installation kit 100. The firearm 40 includes a barrel and a receiver assembly, which are to be assembled by the barrel installation kit 100. The firearm 40 is described in further detail with reference to FIGS. 2 and 3.

Barrel installation kit 100 is employed to assemble a barrel onto a receiver assembly 42 of firearm 40. In at least one embodiment, the barrel installation kit 100 includes a barrel nut 102, a group of barrel nut spacers 104, and a barrel installation tool 106. Barrel nut 102 is configured to assemble the barrel to the receiver assembly 42. The group of barrel nut spacers 104 is configured to be interposed between the barrel nut 102 and the receiver assembly 42 to provide proper space and tension therebetween when the barrel is assembled to receiver assembly 42 through barrel nut 102. The barrel installation tool 106 is used to fasten the barrel nut 102 onto the receiver assembly 42 of the firearm 40 while providing a predetermined alignment between the barrel nut 102 and the receiver assembly 42 with proper tension therebetween. The barrel installation kit 100, including the barrel nut 102, the group of barrel nut spacers 104 and the barrel installation tool 106, are described in further detail with reference to FIGS. 4-23.

Figure 2:
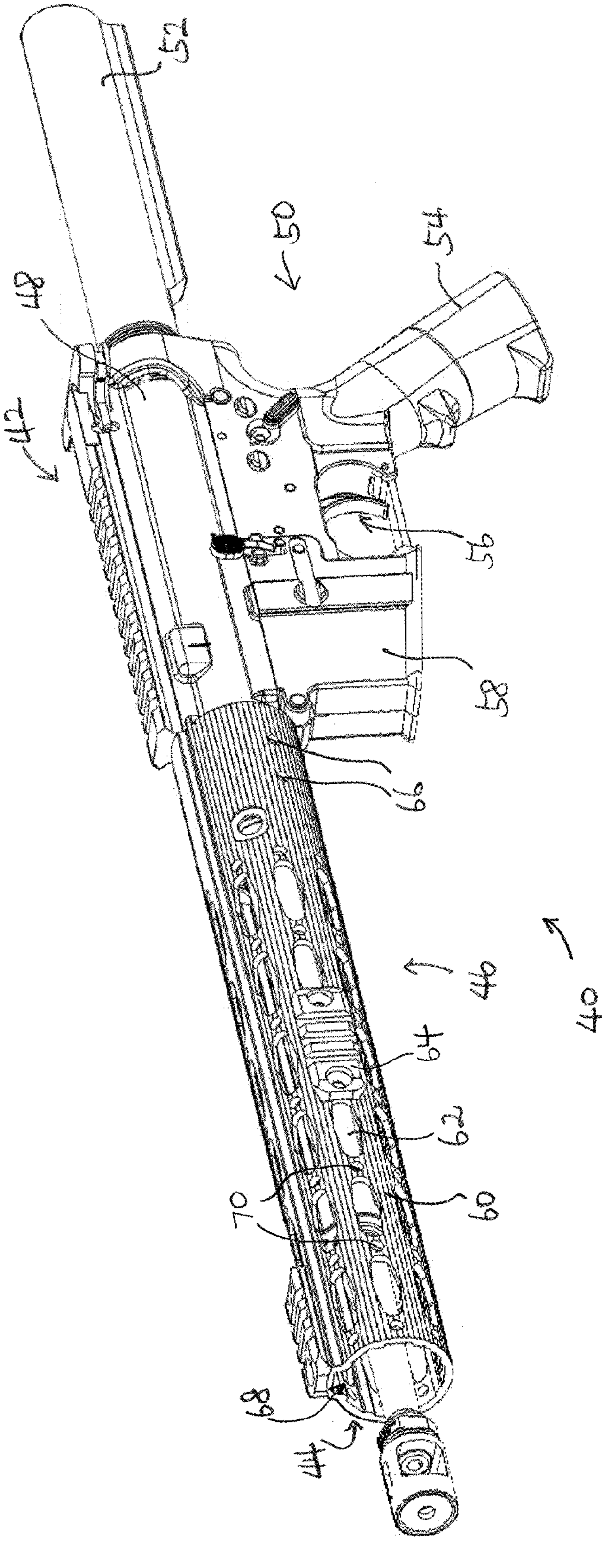
FIG. 2 is a perspective view illustrating an example firearm of FIG. 1.

FIG. 2 is a perspective view illustrating an example firearm 40 of FIG. 1. The firearm 40 generally includes the receiver assembly 42, a barrel assembly 44, and a handguard assembly 46.

The firearm 40 can be of any type. Examples of the firearm 40 include, but are not limited to, handguns, rifles, shotguns, carbines, machine guns, submachine guns, personal defense weapons, automatic rifles, and assault rifles. In at least one embodiment, the firearm 40 is an AR-15, M-16 or M-4 type rifle, or one of their variants.

The receiver assembly 42 is configured to house a firing mechanism and associated components as found in, for example, AR-15, M-16 or M-4 type rifles and their variants. Such a firing mechanism typically includes a spring-biased hammer that is cocked and then released by a sear upon actuating a triggering mechanism. The hammer strikes a firing pin carried by a bolt, which in turn is thrust forward to contact and discharge a cartridge loaded in a chamber. A portion of the expanding combustion gases traveling down the barrel is discharged off and used to drive the bolt rearward against a forward biasing force of a recoil spring for automatically ejecting the spent cartridge casing and automatically loading a new cartridge into the chamber from a magazine when the bolt returns forward. In at least one embodiment, the receiver assembly 42 includes an upper receiver 48 and a lower receiver 50.

The upper receiver 48 defines an internal longitudinally-extending cavity configured to receive a bolt assembly. The bolt assembly is slidably disposed in the cavity for axially reciprocating recoil movement therein. In at least one embodiment, the upper receiver 48 is an AR-15, M-16 or M-4 type upper receiver, or one of their variants.

The lower receiver 50 includes a buttstock 52, a handgrip 54, a trigger mechanism 56, and a magazine well 58. The buttstock 52 provides a means for a shooter to firmly support the firearm 40 and easily aim it by holding the buttstock 52 against his or her shoulder when firing. The handgrip 54 provides a mechanism held by the shooter's hand, including when operating a trigger. The trigger mechanism 56 is configured to actuate the firing sequence of the firearm 40 by operating the bolt assembly accommodated in the upper receiver 48. The magazine well 58 is configured to detachably receive a self-feeding magazine for holding a plurality of cartridges. In at least one embodiment, the lower receiver 50 is removably coupled to the upper receiver 48.

The barrel assembly 44 is configured to be installed to the receiver assembly 42 (for example, the upper receiver 48) and operates to provide a path to release an explosion gas and propel a projectile therethrough. An example of the barrel assembly 44 is described in further detail with reference to FIG. 3.

The handguard assembly 46 operates to provide a handgrip for a user of the firearm 40 and a space for accessories. In at least one embodiment, the handguard assembly 46 includes a handguard 60, a plurality of rail coupling portions 62, and one or more detachable rails 64.

The handguard 60 is attached to the front of the firearm 40 for a user to grip the firearm 40 from the front and protects the user from the barrel 72, which becomes very hot when firing. In at least one embodiment, the handguard 60 is engaged onto the barrel nut 102 and coupled thereto. In this configuration, the handguard 60 includes through-holes 66 for fastening the handguard 60 to the barrel nut 102 with screws, for example. As described below, the barrel nut 102 includes threaded holes 112 (FIG. 3) corresponding to the through-holes 66 of the handguard 60, and the screws are inserted through the threaded holes 112 and further through the through-holes 66 to fasten the handguard 60 to the barrel nut 102.

In at least one embodiment, the handguard 60 includes a gas tube slot 68, into which a gas tube 76 (FIG. 3) is at least partially inserted when the handguard 60 is engaged onto the barrel nut 102.

The rail coupling portions 62 are configured to couple the detachable rails 64 onto the handguard 60. In at least one embodiment, each coupling portion 62 is provided with a pair of through-holes 70 that fastens each detachable rail 64. The detachable rails 64 operate to provide room for attachments to the firearm 40. In at least one embodiment, the detachable rails 64 are configured to be coupled to the rail coupling portions 62 of the handguard 60. The detachable rails 64 are configured to engage different types of attachments, such as flashlights, laser pointers, rifle optics, scopes, and other accessories.

Figure 3:
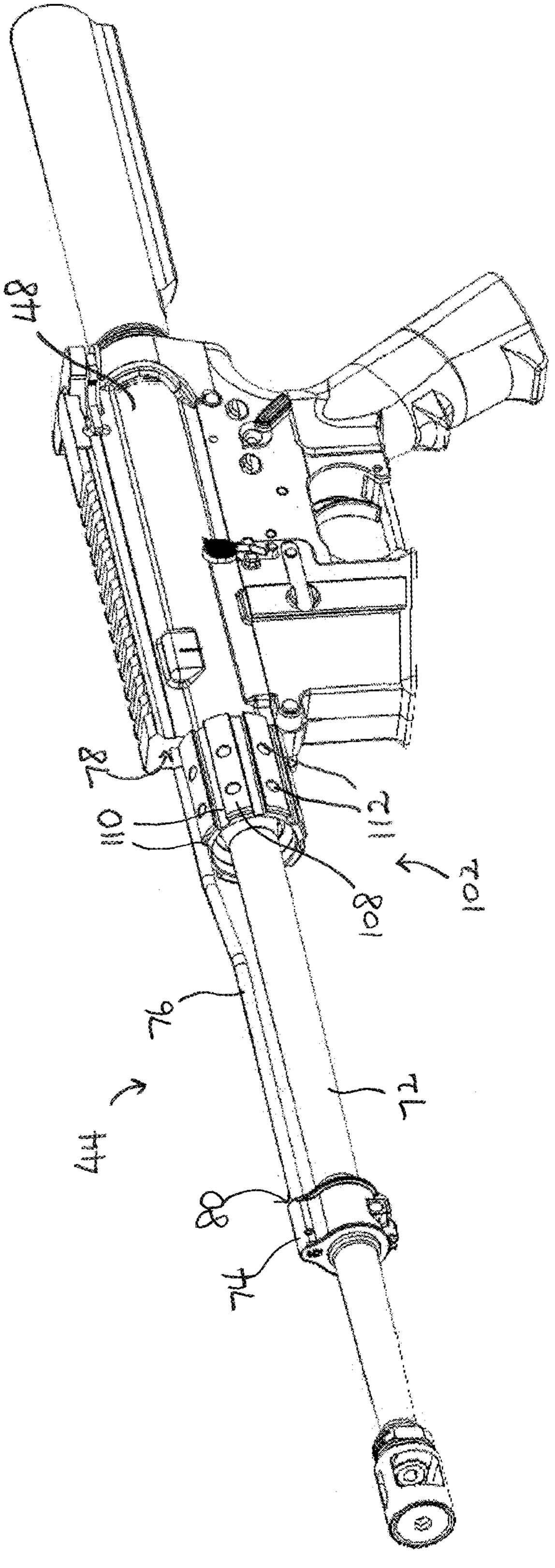
FIG. 3 is a perspective view of the firearm of FIG. 2 with the handguard removed.

FIG. 3 illustrates additional components of the firearm 40 of FIG. 1. FIG. 3 is a perspective view of the firearm 40 of FIG. 1 with the handguard 60 removed to better show the arrangement of the barrel assembly 44 hidden from view when the handguard 60 is in place. In at least one embodiment, the barrel assembly 44 includes a barrel 72, a barrel nut 102, and a group of barrel nut spacers 104. In at least one embodiment, the firearm 40 further includes a gas block 74 and a gas tube 76.

The barrel 72 provides a tube through which an explosion of gases is released to propel a projectile out of the muzzle at a high velocity. In at least one embodiment, the barrel 72 is an AR-15, M-16 or M-4 type barrel. As described below, the barrel 72 is coupled to the upper receiver 48 by using the barrel installation kit 100.

The barrel nut 102 is configured to fasten the barrel 72 to the upper receiver 48. As described below, the barrel installation kit 100 is used to engage the barrel nut 102 onto the upper receiver 48. In at least one embodiment, the barrel nut 102 includes longitudinally-extending splines 108 and longitudinally-extending channels 110 formed between pairs of the splines 108 along the outer surface of the barrel nut 102. The splines 108 and the channels 110 operate to engage the barrel installation tool 106, as described below. In at least one embodiment, the barrel nut 102 includes threaded holes 112 that are aligned with the through-holes 66 of the handguard 60 so that the handguard 60 is coupled with the barrel nut 102 with screws inserted through the through-holes 66 and the threaded holes 112.

In at least one embodiment, one or more barrel nut spacers are selected from the group of barrel nut spacers 104 and interposed between the barrel nut 102 and the upper receiver 48 to provide a predetermined space therebetween when the barrel nut 102 is tightened onto the upper receiver 48. In this document, the group of barrel nut spacers 104 can be referred to as including either one barrel nut spacer or a plurality of barrel nut spacers unless indicated otherwise.

The gas block 74 operates to regulate combustion gases from the fired cartridge. The gas block 74 is in fluid communication with the interior of the barrel 72 so that a portion of the expanding combustion gases trapped behind the bullet within the interior of the barrel 72 is bled off through the gas block 74. For example, the barrel 72 provides a gas port (not shown) at a location on which the gas block 74 is installed. The gas port allows the explosion gases to flow into the gas block 74 and, subsequently, into the gas tube 76.

The gas tube 76 operates to route the combustion gases back to the gas chamber of the upper receiver 48. In at least one embodiment, the gas tube 76 is installed between the gas block 74 and the upper receiver 48 to provide fluid communication between the gas block 74 and the upper receiver 48. For example, the gas tube 76 is inserted into a gas tube hole 78 of the upper receiver 48 and a gas tube hole 80 of the gas block 74. This type of configuration is referred to as a gas direct type or direct impingement system, and typically used in AR-15, M-16 or M-4 type rifles. In this system, the combustion gases from the fired cartridge is discharged from the interior of the barrel 72 and directed back through the gas tube 76 to the breech area of the upper receiver 48 and into the gas chamber associated with a reloading mechanism of the bolt assembly in the gas chamber. The gas acts directly on the bolt carrier to power the reloading mechanism including a reciprocating bolt carrier that holds the bolt.

In at least one embodiment, where the gas tube 76 is connected between the gas block 74 and the upper receiver 48 along the length of the barrel 72, the gas tube 76 is abutted with the barrel nut 102 as shown in FIG. 3. For example, the gas tube 76 is accommodated in one of channels 110 of the barrel nut 102. Thus, the barrel nut 102 must be properly aligned with the upper receiver 48 so that the gas tube 76 is arranged on one of the channels 110 when the gas tube 76 is connected between the gas block 74 and the upper receiver 48. For example, one of the channel 110 must be aligned with the gas tube hole 78 of the upper receiver 48. Further, the barrel nut 102 provides the threaded holes 112 for coupling the handguard 60 with screws. Thus, the barrel nut 102 must be properly arranged with respect to the upper receiver 48 so that the threaded holes 112 are aligned to the through-holes 66 of the handguard 60. In addition to alignment, the barrel nut 102 must operate to provide proper tension between the barrel 72 and the upper receiver 48 when the barrel nut 102 tightens the barrel 72 onto the upper receiver 48. FIGS. 4-21 illustrate examples structure and processes for accomplishing such alignment of the barrel nut 102 with proper tension.

Figure 4:
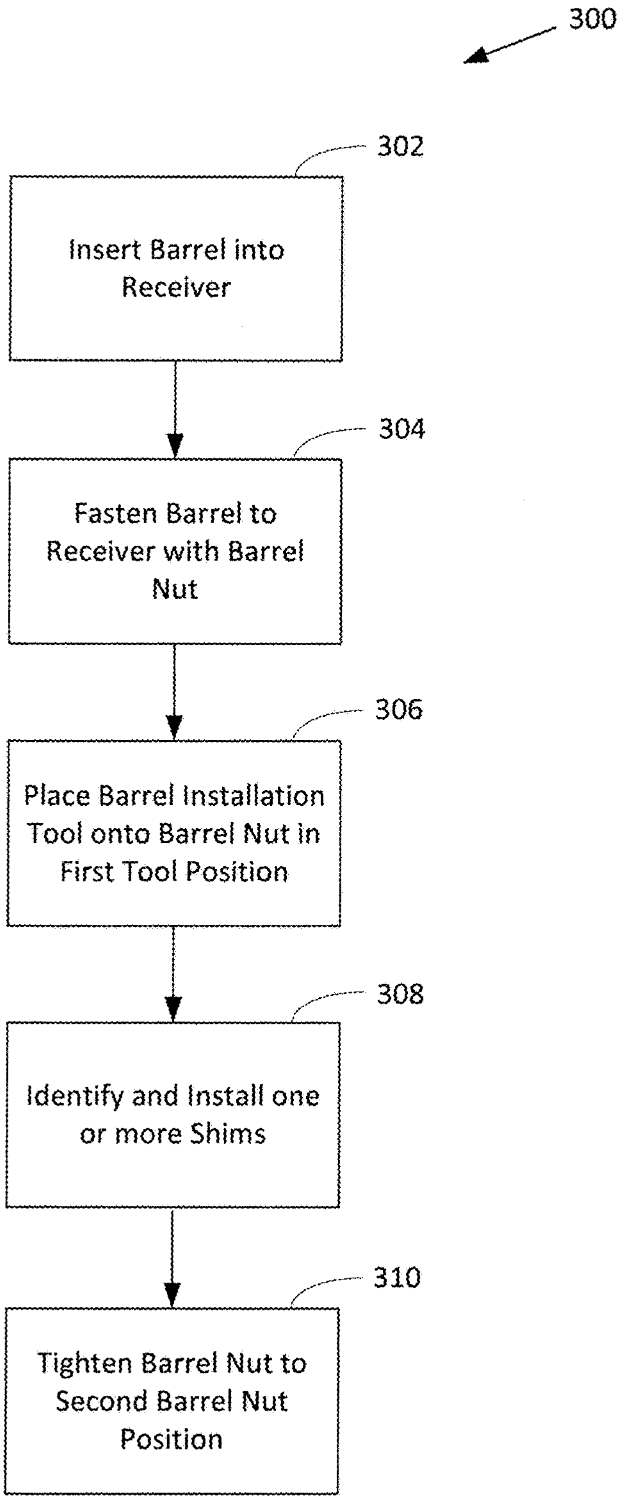
FIG. 4 is a flowchart illustrating an example method of installing a barrel onto an upper receiver of a firearm.

FIG. 4 is a flowchart illustrating an example method 300 of installing the barrel 72 onto the upper receiver 48 of the firearm 40. The method 300 includes inserting the barrel 72 into the upper receiver 48 (operation 302); fastening the barrel 72 to the upper receiver 48 with the barrel nut 102 (operation 304); placing the barrel installation tool 106 onto the barrel nut 102 in a first tool position (operation 306); identifying and installing one or more barrel nut spacers selected from the group of barrel nut spacers 104 (operation 308); and tightening the barrel nut 102 onto the upper receiver 48 to a second barrel nut position (operation 310). In at least one embodiment, the method 300 further includes securing the upper receiver 48 to a vise that is attached to a workbench so that the upper receiver 48 is not moved when performing the following steps of the method 300. An example of the method 300 is described below in further detail with reference to FIGS. 5-21. In particular, the operation 302 is described with reference to FIG. 5. The operation 304 is described with reference to FIGS. 6-10. The operation 306 is described with reference to FIGS. 11-17. The operation 308 is described with reference to FIGS. 18-22. The operation 310 is described with reference to FIG. 23.

Figure 5:
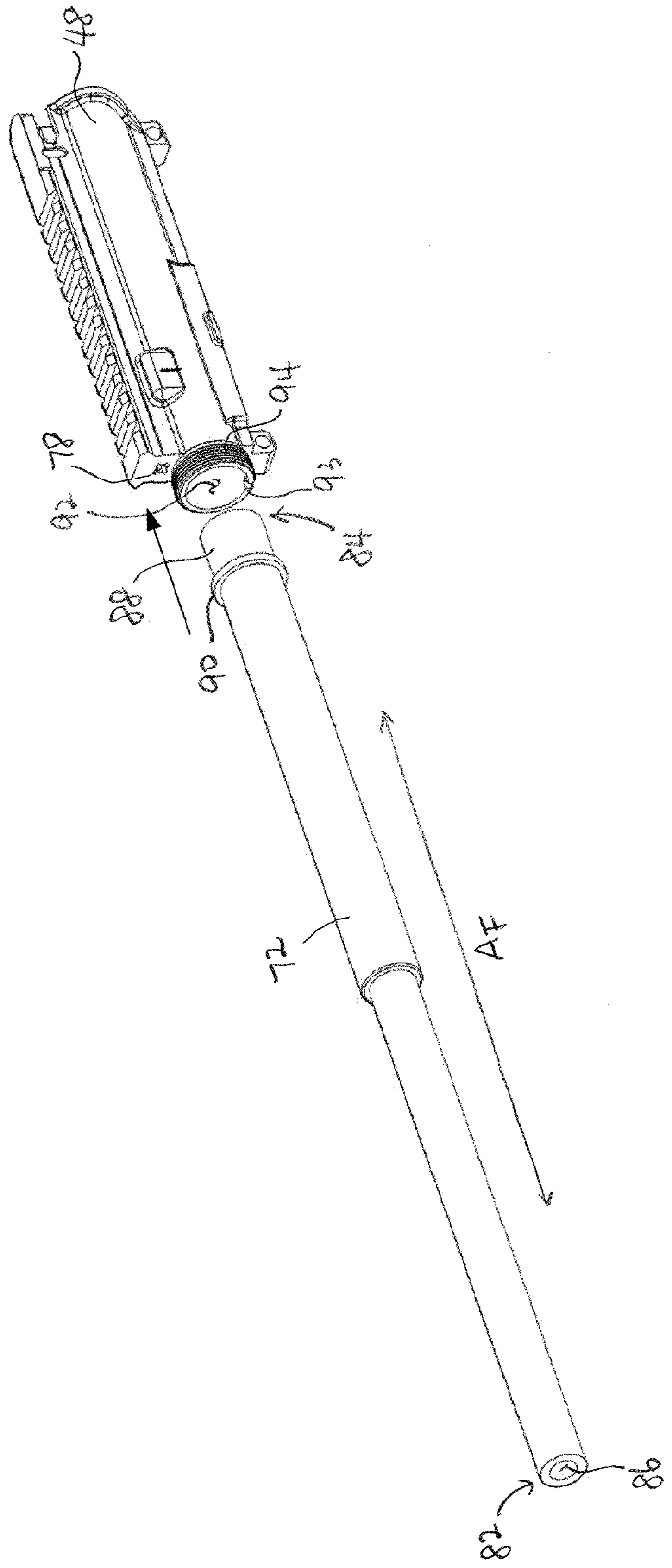
FIG. 5 is a perspective view of a barrel and an upper receiver, illustrating an example operation of inserting the barrel onto the upper receiver.

FIG. 5 is a perspective view of the barrel 72 and the upper receiver 48, illustrating an example of the operation 302. At the operation 302, the barrel 72 is inserted into the upper receiver 48. In at least one embodiment, the barrel 72 is detachable from the upper receiver 48 for replacement.

The barrel 72 has a forward muzzle end 82 and a rearward breech end 84. The barrel 72 defines a longitudinal axis $A_F$ for the firearm 40 and an inner bore 86 that forms an axial path for a bullet. In at least one embodiment, a portion of the inner bore 86 includes rifling for imparting spin to the bullet when the firearm 40 is fired.

The barrel 72 includes an engaging portion 88 at the rearward breech end 84. The engaging portion 88 is configured to be inserted to the upper receiver 48 for support of the barrel 72 against the upper receiver 48. The barrel 72 also includes an annular engaging flange 90 extending outwardly from the barrel 72 adjacent the engaging portion 88. The engaging flange 90 is configured to abut the upper receiver 48, as described below, when the barrel 72 is inserted into the upper receiver 48.

Figure 9:
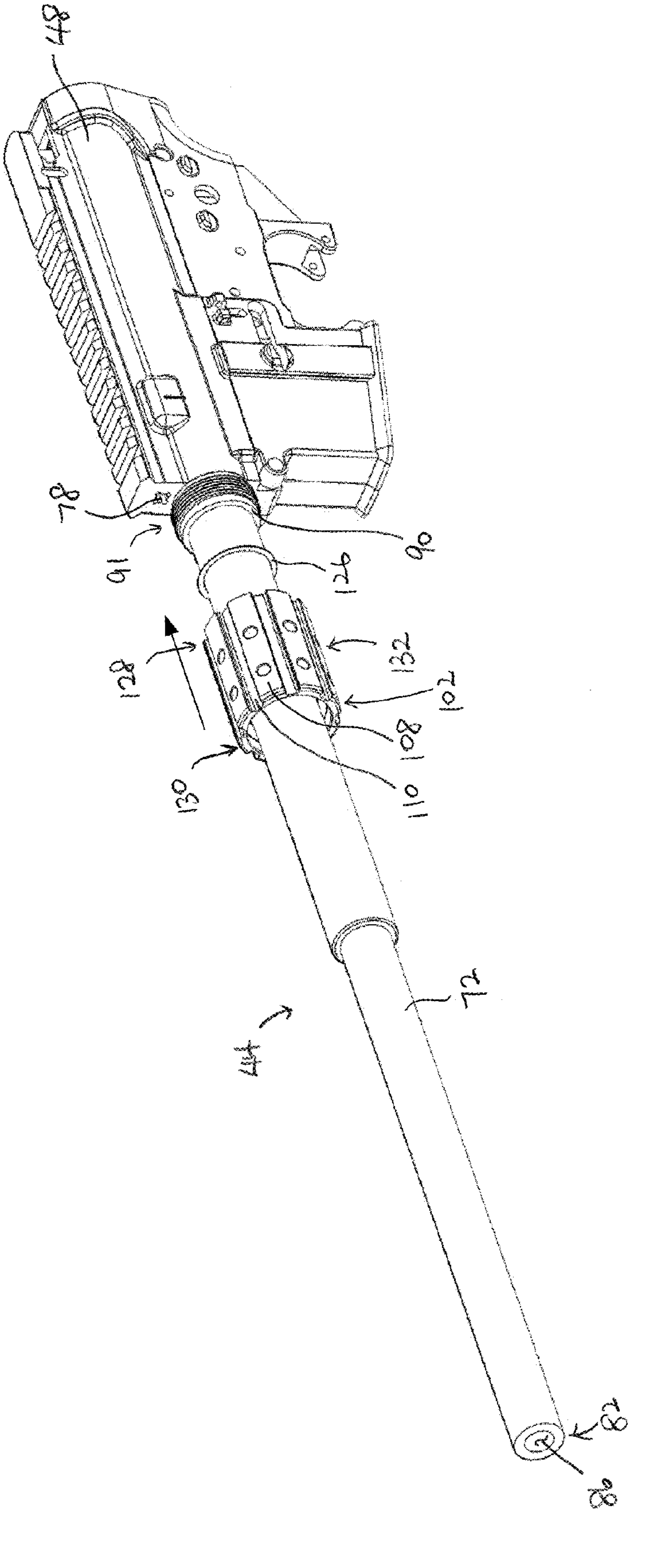
FIG. 9 is a perspective view of a barrel assembly, illustrating the operation of FIG. 6.

The upper receiver 48 includes a mounting nipple 91 extending from the front of the upper receiver 48. The mounting nipple 91 defines a receiving bore 92 therein, which is in fluid communication with the chamber of the upper receiver 48. The receiving bore 92 is configured to receive the engaging portion 88 of the barrel 72. The mounting nipple 91 has a lip 93 at the forward edge thereof, against which the engaging flange 90 of the barrel 72 is abutted when the barrel 72 is inserted into the upper receiver 48. The mounting nipple 91 further includes an externally threaded portion 94 for engaging internal threads 136 of the barrel nut 102 (FIG. 9). The threaded portion 94 is formed on the outer surface of the mounting nipple 91.

At the operation 302, the barrel 72 is engaged with the upper receiver 48 by inserting the engaging portion 88 into the receiving bore 92 defined by the mounting nipple 91 of the upper receiver 48 until the engaging flange 90 of the barrel 72 is adjoined against the lip 93 of the mounting nipple 91.

FIGS. 6-10 illustrate the operation 304 of FIG. 4. As shown in FIG. 4, at the operation 304, the barrel 72 is fastened to the upper receiver 48 with the barrel nut 102.

Figure 6:
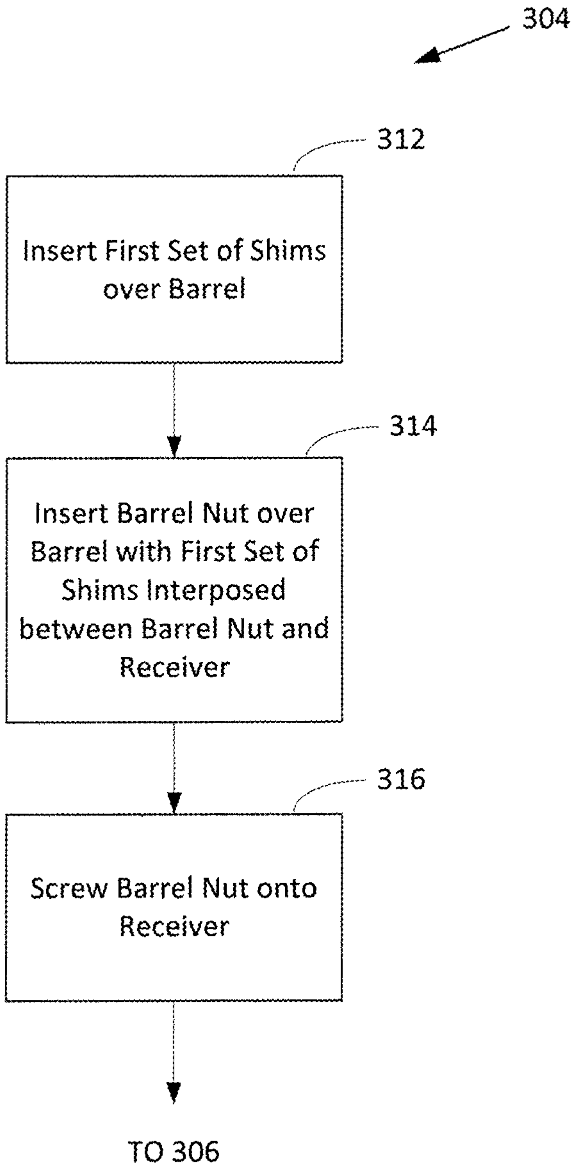
FIG. 6 is a flowchart illustrating an example method of fastening a barrel to the upper receiver with a barrel nut.

FIG. 6 is a flowchart illustrating an example method of fastening the barrel to the upper receiver with a barrel nut. In at least one embodiment, the method is an example of the operation 304 of FIG. 4. In at least one embodiment, the operation 304 begins with inserting a first set of barrel nut spacers 126 (FIG. 9) over the barrel 72 (operation 312). The first set of barrel nut spacers 126 includes one or more barrel nut spacers selected from the group of barrel nut spacers 104. Once the first set of barrel nut spacers 126 is engaged over the barrel 72, the barrel nut 102 is inserted over the barrel 72 with the first set of barrel nut spacers 126 interposed between the barrel nut 102 and the upper receiver 48 (operation 314). After the first set of barrel nut spacers 126 is inserted over the barrel 72 (operation 312) and the barrel nut 102 is inserted over the barrel 72 with the first set of barrel nut spacers 126 interposed between the barrel nut 102 and the upper receiver 48 (operation 314), the barrel nut 102 is screwed onto the upper receiver 48 (operation 316). The operations 312, 314, and 316 are described with reference to FIGS. 7-10.

Figure 7:
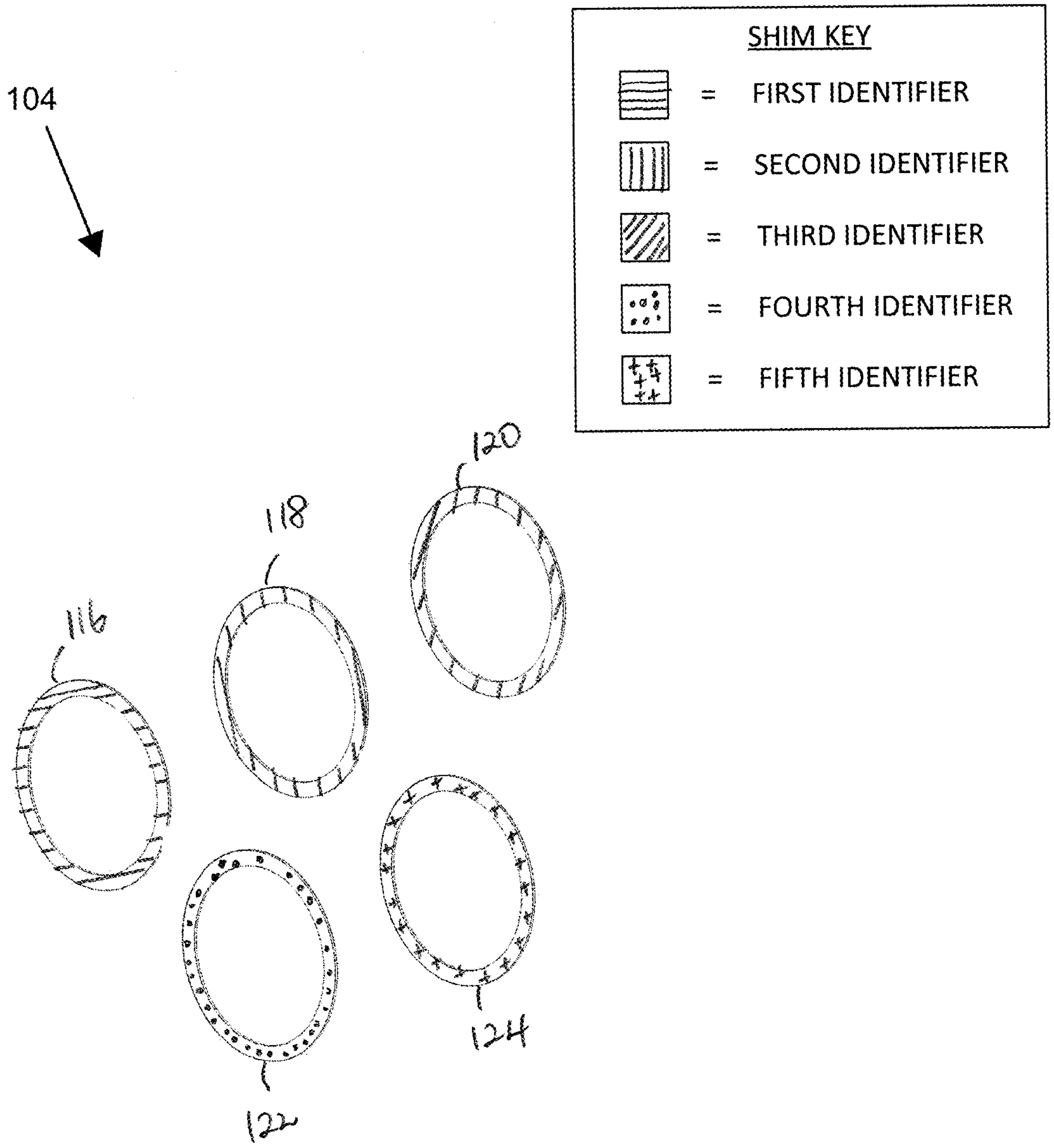
FIG. 7 is a schematic view of an example group of barrel nut spacers of FIG. 1.

FIG. 7 is a schematic view of an example group of barrel nut spacers 104. The group of barrel nut spacers 104 includes one or more barrel nut spacers with different configurations, such as different thicknesses.

In at least one embodiment, a barrel nut spacer in the group 104 is shaped as a thin metal ring or washer having an inner diameter substantially corresponding to the diameter of the barrel 72 at the engaging flange 90. The group of barrel nut spacers 104 operates as spacers for providing a proper space between the barrel nut 102 and the upper receiver 48 when the barrel nut 102 is fastened onto the upper receiver 48. In at least one embodiment, one or more barrel nut spacers selected from the group of barrel nut spacers 104 is combined and used to acquire the thickness required for proper orientation or alignment of the barrel nut 102 with respect to the upper receiver 48, as well as for proper fit or tension between the barrel nut 102 and the upper receiver 48.

The group of barrel nut spacers 104 includes one or more barrel nut spacers with different thicknesses. In at least one embodiment, the group of barrel nut spacers 104 provides 2 to 25 barrel nut spacers. In at least one embodiment, the group of barrel nut spacers 104 provides 3 to 7 barrel nut spacers. In at least one embodiment, the barrel nut spacers in the group 104 have different thicknesses. In at least one embodiment, the barrel nut spacers in the group 104 have the same thickness. In at least one embodiment, some barrel nut spacers in the group 104 have the same thickness, and the other barrel nut spacers in the group 104 have different thicknesses. In the depicted example, the group of barrel nut spacers 104 provides five barrel nut spacers with different thicknesses. For example, a first barrel nut spacer 116 is 0.008 inches in thickness; a second barrel nut spacer 118 is 0.009 inches in thickness; a third barrel nut spacer 120 is 0.010 inches in thickness; a fourth barrel nut spacer 122 is 0.012 inches in thickness; and a fifth barrel nut spacer 124 is 0.015 inches in thickness. In at least one embodiment, as illustrated in the barrel nut spacer selection table 114, the group of barrel nut spacers 104 includes different barrel nut spacers with different variations in thickness.

In at least one embodiment, the barrel nut spacers 104 are distinguished by different identifiers to indicate different thicknesses. Examples of such identifiers include, but are not limited to, colors, numbers, letter descriptions, and/or symbols. For example, the barrel nut spacers 104 are labeled with different colors to indicate different thicknesses. For example, the first barrel nut spacer 116 is coded with blue; the second barrel nut spacer 118 is coded with green; the third barrel nut spacer 120 is coded with red; the fourth barrel nut spacer 122 is coded with purple; and the fifth barrel nut spacer 124 is coded with black.

FIG. 8 illustrates an example barrel nut spacer selection table 114. The barrel nut spacer selection table 114, which is also referred to as a shim selection table, is provided to explain configurations, such as thicknesses, of different barrel nut spacers in the group 104. In this example, the table 114 illustrates that the first barrel nut spacer 116, as identified with the first identifier, is 0.008 inches in thickness; the second barrel nut spacer 118, as identified with the second identifier, is 0.009 inches in thickness; the third barrel nut spacer 120, as identified with the third identifier, is 0.010 inches in thickness; the fourth barrel nut spacer 122, as identified with the fourth identifier, is 0.012 inches in thickness; and the fifth barrel nut spacer 124, as identified with the fifth identifier, is 0.015 inches in thickness. In at least one embodiment, the barrel nut spacers 104 have different variations in thickness.

FIG. 9 is a perspective view of the barrel assembly 44, illustrating the operation 304 of FIG. 6. As shown in FIG. 9, at the operation 312, the first set of barrel nut spacers 126 is inserted over the barrel 72 up to the engaging flange 90. In this example, the first set of barrel nut spacers 126 is the fifth barrel nut spacer 124 of the group of barrel nut spacers 104 (FIG. 7), but in at least one other embodiment multiple, different, or no barrel nut spacers can alternatively be used.

As described above, once the first set of barrel nut spacers 126 is engaged over the barrel 72, the barrel nut 102 is inserted over the barrel 72 with the first set of barrel nut spacers 126 interposed between the barrel nut 102 and the upper receiver 48 at the operation 314. As shown in FIG. 9, the barrel nut 102 is configured to fasten the barrel 72 to the upper receiver 48. The barrel nut 102 is cooperatively sized and configured with the handguard 60 to removably engage the handguard 60 with the barrel nut 102, as shown in FIG. 1. The barrel nut 102 is configured to be removably or permanently coupled to the upper receiver 48. In at least one embodiment, the barrel nut 102 is removably attached to the upper receiver 48 via a threaded connection, as described below in further detail. The barrel nut 102 is a generally tubular structure and acts as an ordinary nut.

The barrel nut 102 has a receiver end 128 and a barrel end 130. The receiver end 128 is positioned opposite to the barrel end 130 along the longitudinal axis of the barrel nut 102. The barrel nut 102 is fastened to the upper receiver 48 in a manner that the receiver end 128 is arranged adjacent the upper receiver 48 and the barrel end 130 is arranged away from the upper receiver 48 along the longitudinal axis $A_F$ of the firearm 40.

In at least one embodiment, the barrel nut 102 includes a tool locking portion 132. The tool locking portion 132 of the barrel nut 102 is configured to engage and interlock with the barrel installation tool 106. In at least one embodiment, the tool locking portion 132 includes splines 108 arranged in diametrically opposing relationships and circumferentially spaced part from each other along the outer surface of the barrel nut 102. The splines 108 extend radially outwards from the outer surface of the barrel nut 102. The splines 108 can be elongated and extend in a longitudinal direction in the barrel nut 102 (or along the longitudinal axis $A_F$ of the firearm 40). In at least one embodiment, the splines 108 extend at least proximately to the barrel end 130 of the barrel nut 102 to assist with guiding the barrel installation tool 106 into the barrel nut 102.

Figure 13:
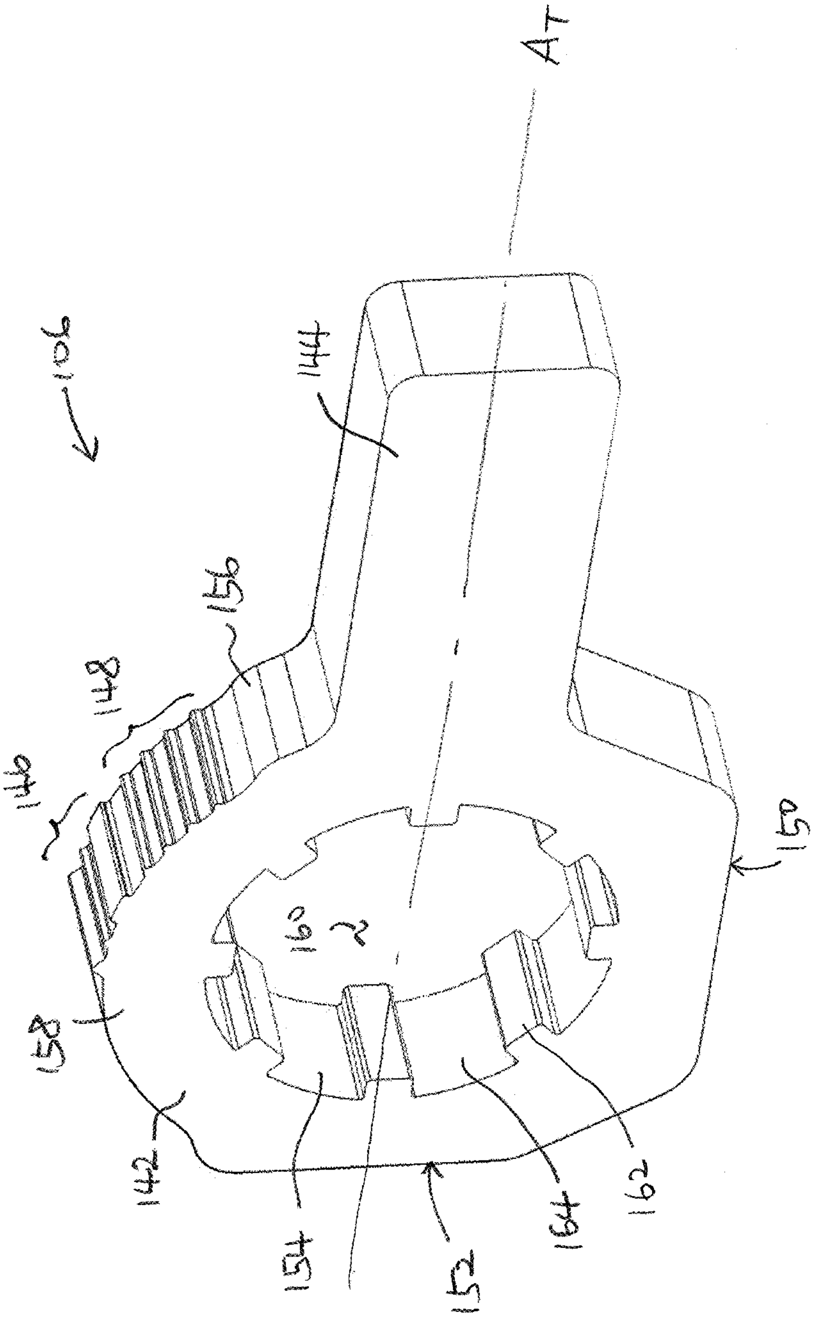
FIG. 13 is a perspective view of the barrel installation tool of FIG. 12.

The tool locking portion 132 also includes the longitudinally-extending channels 110 formed between pairs of the splines 108 along the outer surface of the barrel nut 102. The channels 110 defined by the splines 108 are configured to slidably receive therein a complementary configured and dimensioned head portion 142 of the barrel installation tool 106 (FIG. 13). Similarly to the splines 108, the channels 110 are arranged in diametrically opposing relationships and circumferentially spaced apart from each other along the outer surface of the barrel nut 102. In this configuration, the splines 108 and the channels 110 are alternately arranged around the outer surface of the barrel nut 102. As described above, one of the channels 110 must be aligned with the gas tube hole 78 when the barrel nut 102 is fastened onto the mounting nipple 91 of the upper receiver 48.

Any suitable number of the splines 108 can be provided so long as a secure locking relationship is established between the barrel nut 102 and the barrel installation tool 106, as discussed below. In at least one embodiment, the number of the splines 108 matches the number of locking grooves 164 (FIG. 14) of the barrel installation tool 106. In one embodiment, by way of example without limitation, eight splines 108 are provided that correspond with the locking grooves 164 of the barrel installation tool 106. In this configuration, the radial centerline of each spline 108 and each corresponding channel 110 is angularly arranged at an angle A1 of about 45 degrees from each other. In at least one embodiment, other suitable numbers of the splines 108 are used, provided that the barrel installation tool 106 is operably engaged with the tool locking portion 132.

Figure 10:
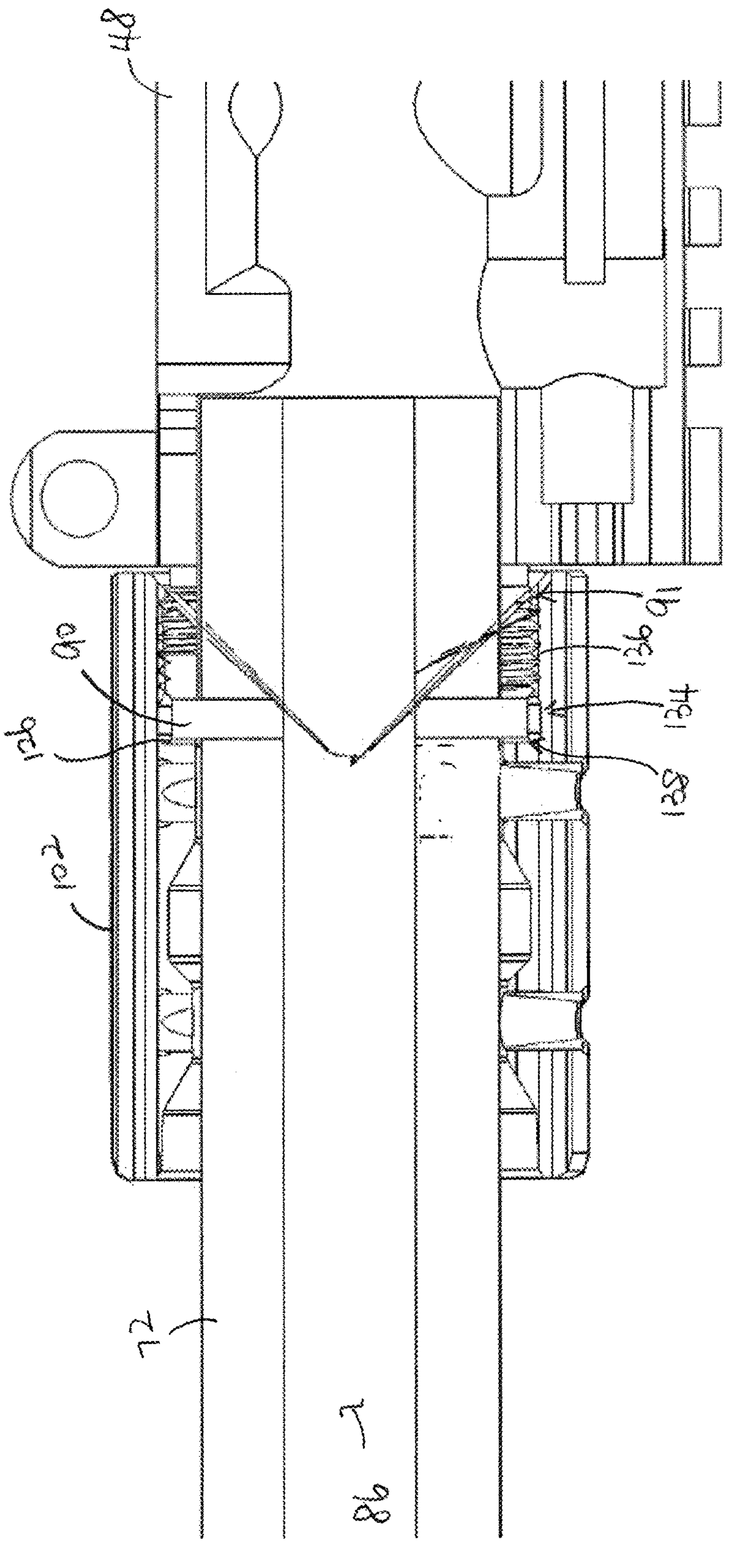
FIG. 10 is a cross-sectional view of a barrel assembly, illustrating a barrel nut positioned for attachment of the barrel to the upper receiver with the barrel nut spacers interposed therebetween.

FIG. 10 is a cross-sectional view of the barrel assembly 44, illustrating the barrel nut 102 positioned for attachment of the barrel 72 to the upper receiver 48 with the barrel nut spacers 104 interposed therebetween.

In at least one embodiment, the barrel nut 102 further includes a barrel locking portion 134 configured for attaching the barrel 72 to the upper receiver 48. In at least one embodiment, the barrel locking portion 134 includes the internal threads 136 and a barrel locking lug 138. The internal threads 136 is formed on a portion of the inner surface of the barrel nut 102 adjacent the receiver end 128 and configured to removably engage the complementary threaded portion 94 of the mounting nipple 91. The barrel locking lug 138 is annually formed around the inner surface of the barrel nut 102 and extends radially inwards from the inner surface of the barrel nut 102 adjacent the internal threads 136. The barrel locking lug 138 is configured to be abutted against the engaging flange 90 with or without one or more of the barrel nut spacers 104 interposed between the barrel locking lug 138 and the engaging flange 90 when the barrel nut 102 is fastened onto the mounting nipple 91.

As described above, after the first set of barrel nut spacers 126 is inserted over the barrel 72 and the barrel nut 102 is inserted over the barrel 72 with the first set of barrel nut spacers 126 interposed between the barrel nut 102 and the upper receiver 48, the barrel nut 102 is screwed onto the upper receiver 48 at the operation 316. In particular, after the operations 312 and 314, the barrel nut 102 is then slipped over the barrel 72 and screwed onto the mounting nipple 91 by engaging the internal threads 136 with the threaded portion 94 of the mounting nipple 91. The engaging flange 90 of the barrel 72 is thereby trapped between the barrel locking lug 138 and the lip 93 of the mounting nipple 91. The first set of barrel nut spacers 126 is also trapped between the barrel locking lug 138 and the engaging flange 90. Accordingly, the barrel 72 is held to the upper receiver 48 by trapping the engaging flange 90 against the mounting nipple 91 of the upper receiver 48 with the barrel nut 102.

In at least one embodiment, the operation 316 is performed by hand. For example, a user can hold the outer surface, such as the tool locking portion 132, of the barrel nut 102 and thread the barrel nut 102 over the mounting nipple 91. In at least one embodiment, the operation 316 is performed with the barrel installation tool 106. As described below, the barrel installation tool 106 is inserted onto the barrel nut 102 to engage the tool locking portion 132 of the barrel nut 102 (FIG. 11) and, then, the barrel installation tool 106 is turned by hand to tighten the barrel nut 102 onto the mounting nipple 91. The barrel nut 102 is tightened onto the mounting nipple 91 by turning the barrel installation tool 106 as hard as possible. This is to ensure that the first set of barrel nut spacers 126 is fully seated between the engaging flange 90 and the barrel locking portion 134, thereby allowing an accurate reading on a barrel nut position indicating portion 146 and a barrel nut spacer selection portion 148 of the barrel installation tool 106, as described below. In at least one embodiment, a user repeats tightening and loosening of the barrel nut 102 three or more times using the barrel installation tool 106 to further ensure the attachment of the barrel nut 102 onto the upper receiver 48.

Figure 11:
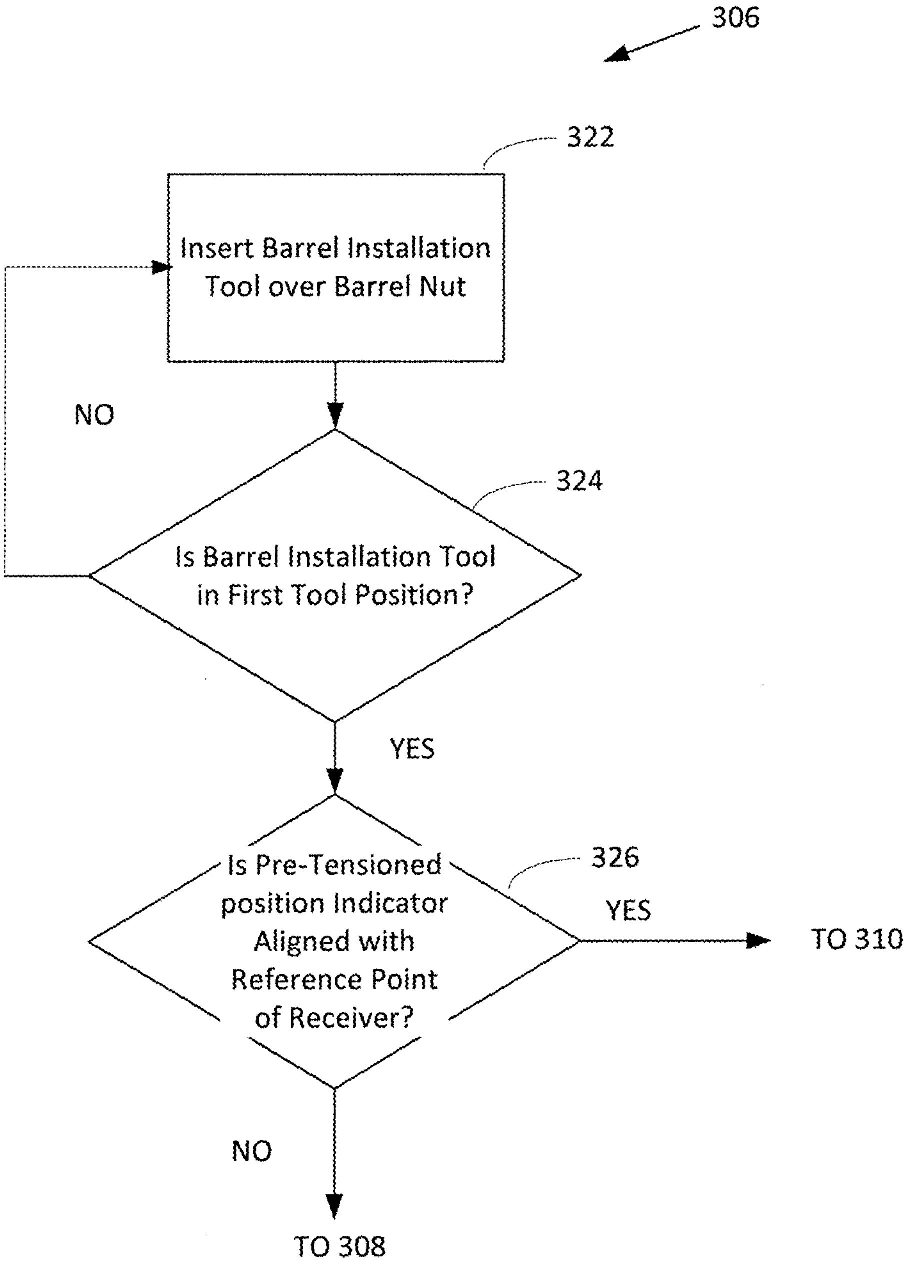
FIG. 11 is a flowchart illustrating an example method of placing a barrel installation tool onto a barrel nut in a first tool position.

FIG. 11 is a flowchart illustrating an example method of placing a barrel installation tool onto the barrel nut in a first tool position. In at least one embodiment, the method is an example of the operation 306 of FIG. 4. At the operation 306, the barrel installation tool 106 is placed onto the barrel nut 102 in a first tool position. When the barrel installation tool 106 is in the first tool position, the barrel nut 102 is appropriately arranged with respect to the upper receiver 48 so as to be tightened further against the upper receiver 48 for desired alignment and tension. In at least one embodiment, the operation 306 starts with inserting the barrel installation tool 106 over the barrel nut 102 (operation 322). After the barrel installation tool 106 is inserted over the barrel nut 102, it is determined whether the barrel installation tool 106 is in a first tool position (operation 324). Then, optionally, the user determines whether the pre-tensioned position indicator 170 is aligned with the reference line 186 of the upper receiver 48 (operation 326). As the operation 326 is optional, in at least one embodiment, the method proceeds directly from the operation 324 to the operation 308. The operation 322 is described with reference to FIGS. 12-15. The operation 324 is described with reference to FIG. 16. The operation 326 is described with reference to FIG. 17.

Figure 12:
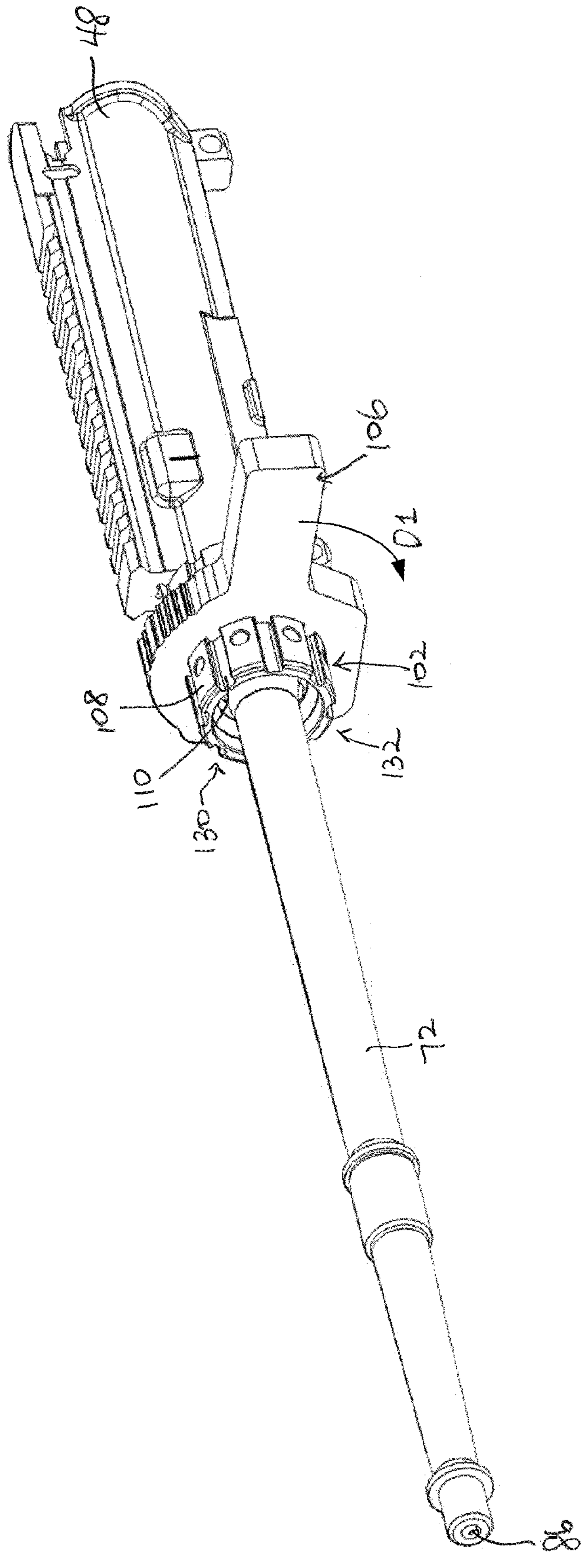
FIG. 12 is a perspective view of an example barrel installation tool engaged with a barrel nut.

FIG. 12 is a perspective view of an example barrel installation tool 106 engaged with the barrel nut 102. The barrel installation tool 106 operates to tighten, or loosen, the barrel nut 102 against the upper receiver 48, functioning as a wrench. In addition, the barrel installation tool 106 operates to determine whether the barrel nut 102 is arranged with respect to the upper receiver 48 with proper tension and alignment after fully tightening the barrel nut 102 against the upper receiver 48. The barrel installation tool 106 is also used to select one or more of the barrel nut spacers 104 that are appropriate for alignment and tension between the barrel nut 102 and the upper receiver 48.

The barrel installation tool 106 is inserted over the barrel 72 and then slides over the barrel nut 102 from the barrel end 130. As described below, the barrel installation tool 106 is engaged with the tool locking portion 132. In particular, the head portion 142 of the barrel installation tool 106 slidably engages the splines 108 and the channels 110 of the barrel nut 102, thereby interlocking the barrel installation tool 106 with the barrel nut 102. In at least one embodiment, the barrel installation tool 106 is turned clockwise as shown in FIG. 12 (in direction D1) to tighten the barrel nut 102, and vice versa.

In at least one embodiment, the barrel installation tool 106 is manufactured with aluminum by extrusion. However, the barrel installation tool 106 can be made from any material that endures compressive and shear stresses during extrusion and has sufficient strength for the purpose of the tool. In at least one embodiment, the barrel installation tool 106 is made by machining.

FIG. 13 is a perspective view of an example of the barrel installation tool 106 of FIG. 12. In this example, the barrel installation tool 106 has a longitudinal tool axis $A_T$. The barrel installation tool 106 includes a head portion 142, a handle portion 144, a barrel nut position indicating portion 146, and a barrel nut spacer selection portion 148. In at least one embodiment, the barrel installation tool 106 further includes a flat bottom portion 150 and a flat side portion 152.

The head portion 142 is configured to be slidably engaged with the tool locking portion 132 of the barrel nut 102. The head portion 142 is formed generally as a ring having an inner surface 154, an outer surface 156, and a side surface 158. The head portion 142 includes a receiving bore 160, a plurality of locking projections 162, and a plurality of locking grooves 164. The receiving bore 160 is dimensioned to receive the barrel nut 102. The receiving bore 160 has a center C thereof, and is arranged so that the tool axis $A_T$ passes though the center C. The locking projections 162 and the locking grooves 164 are formed on the inner surface 154 for engaging and interlocking with the tool locking portion 132 of the barrel nut 102, which includes the splines 108 and the channels 110. In at least one embodiment, the head portion 142 has an arc shape (e.g., FIGS. 25 and 26), instead of circular shape, provided that the head portion 142 provides secured engagement with the tool locking portion 132 of the barrel nut 102. As described above, the barrel installation tool 106 is configured to engage at least some of the splines 108 to lock the barrel installation tool 106 to the barrel nut 102. In at least one embodiment, the barrel installation tool 106 engages all of the splines 108.

The handle portion 144 provides a grip for turning the barrel installation tool 106 around the barrel nut 102. The handle portion 144 is a portion of the barrel installation tool 106 that is configured to be grasped by a hand or engaged by a tool, such as to receive a force suitable to cause rotation of the barrel nut 102. In at least one embodiment, the handle portion 144 is connected to the head portion 142. In at least one embodiment, the handle portion 144 is operated by hand. In at least one other embodiment, the handle portion 144 is configured to be engaged by another tool or instrument, such as for providing additional leverage to the barrel installation tool 106 when turning the barrel installation tool 106 and the barrel nut 102. Examples of such a tool or instrument include a piece of pipe, a metal stick, a square drive of a ratchet, and a breaker bar. For example, a piece of pipe is inserted onto the handle portion 144 to provide an additional length to the handle portion 144, thereby easing the rotation of the barrel installation tool 106 around the barrel nut 102 with a smaller amount of turning force. In at least one other embodiment, the handle portion 144 provides a tool engaging portion or hole (e.g., FIG. 25 or 26) configured to receive a metal stick or bar that eases the rotation of the barrel installation tool 106 around the barrel nut 102.

In addition, the handle portion 144 provides a reference for determining whether the barrel installation tool 106 is engaged with the barrel nut 102 in a proper position before performing a barrel nut spacer selection operation and/or a barrel alignment operation. In at least one embodiment, the handle portion 144 extends from the outer surface 156 of the head portion 142, and is integrally formed with the head portion 142. The handle portion 144 is arranged to extend from the head portion 142 along the tool axis $A_T$.

The barrel nut position indicating portion 146 operates to indicate an amount of rotation of the barrel nut 102 required to properly align the barrel nut 102 with the upper receiver 48 while providing proper tension between the barrel nut 102 and the upper receiver 48. In at least one embodiment, the barrel nut position indicating portion 146 is arranged on a portion of the outer surface 156 of the head portion 142.

The barrel nut spacer selection portion 148 operates to select one barrel nut spacer or a set of barrel nut spacers from the group of barrel nut spacers 104 for properly spacing the barrel nut 102 from the upper receiver 48 when the barrel nut 102 is fastened to the upper receiver 48. In at least one embodiment, the barrel nut spacer selection portion 148 is arranged on a portion of the outer surface 156 of the head portion 142 adjacent the barrel nut position indicating portion 146. In this document, a set of barrel nut spacers can be referred to as either one barrel nut spacer or a plurality of barrel nut spacers unless indicated otherwise.

In at least one embodiment, the barrel installation tool 106 includes the flat bottom portion 150 and the flat side portion 152, which are formed on the outer surface 156 of the head portion 142. The flat bottom and side portions 150 and 152 allow easy and safe operation of an extrusion saw jaw, which operates to cut an extruded profile for producing the barrel installation tool 106. For example, the flat bottom portion 150 allows the extruded profile to easily sit on a vise so that the saw jaw safely cuts the profile to make each barrel installation tool 106. The flat side portion 152 allows the extruded profile to reliably stand against the saw jaw. Further, the flat bottom and side portions 150 and 152 reduce a dimension or volume of the barrel installation tool 106 and, thus, save materials used for manufacturing the barrel installation tool 106.

Figure 14:
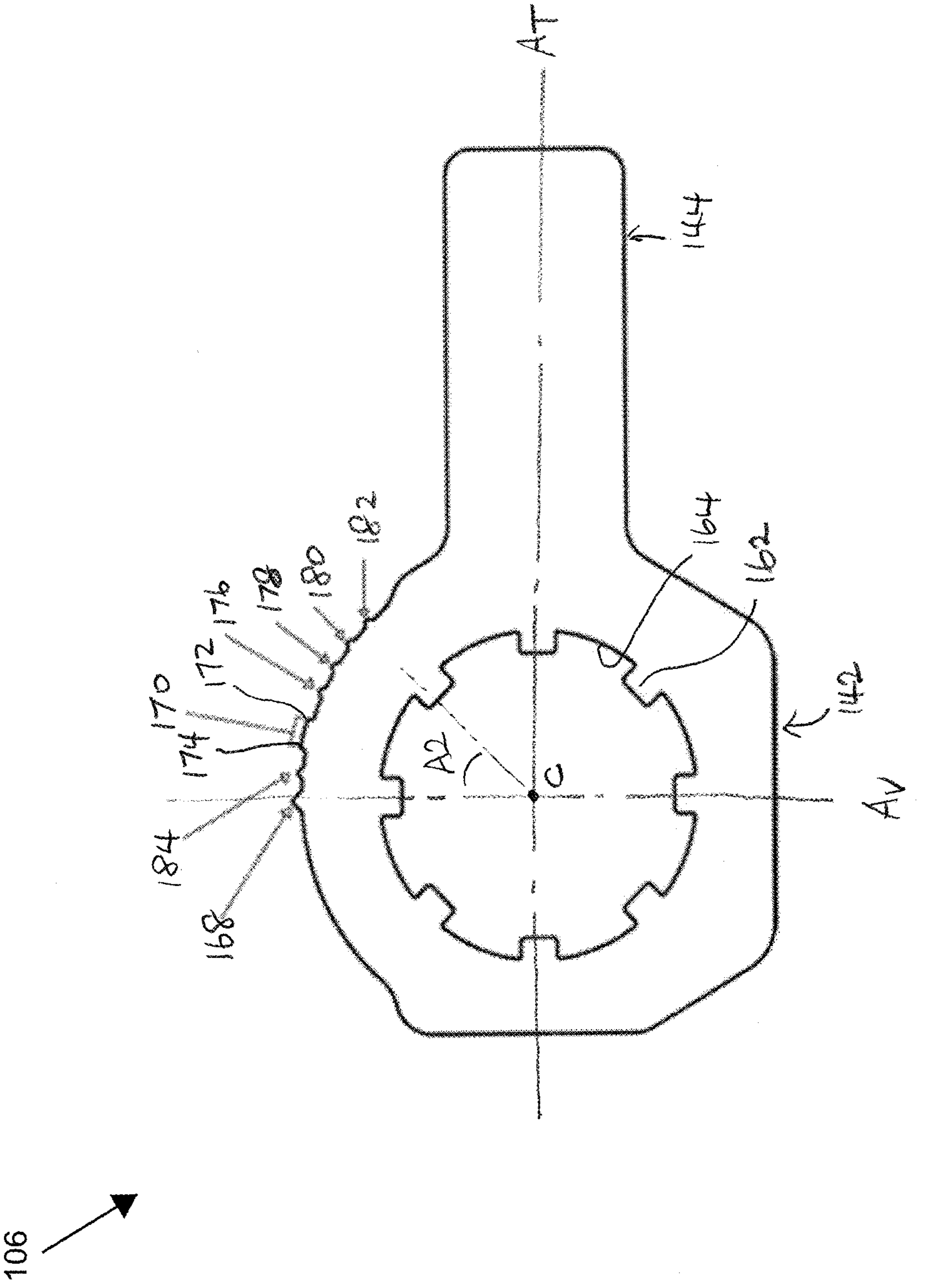
FIG. 14 is a front side view of the barrel installation tool of FIG. 13, illustrating the arrangement and dimension of the components of the barrel installation tool.

FIG. 14 is a front side view of an example of the barrel installation tool 106 of FIG. 13, illustrating the arrangement and dimension of the components thereof. In particular, the head portion 142, the barrel nut position indicating portion 146 and the barrel nut spacer selection portion 148 are described below in further detail.

As described above, the head portion 142 includes the locking projections 162 and the locking grooves 164. The locking projections 162 are configured to provide complementary engagement with the channels 110 of the barrel nut 102. The locking projections 162 are arranged in diametrically opposing relationships and circumferentially spaced apart from each other along the inner surface 154 of the head portion 142. The locking projections 162 extend radially inwards from the inner surface 154 of the head portion 142. The locking grooves 164 are defined by adjacent pairs of the locking projections 162, and configured to provide complementary engagement with the splines 108 of the barrel nut 102. Similar to the locking projections 162, the locking grooves 164 are arranged in diametrically opposing relationships and circumferentially spaced apart from each other along the inner surface 154 of the head portion 142. As such, the locking projections 162 and the locking grooves 164 are alternately arranged around the inner surface 154 of the head portion 142.

Any number of the locking projections 162 and the locking grooves 164 can be provided so long as a secure locking relationship is established between the barrel nut 102 and the barrel installation tool 106. In at least one embodiment, the number of the locking projections 162 matches the number of the channels 110 of the barrel nut 102, and the number of locking grooves 164 matches the number of splines 108 of the barrel nut 102. In one embodiment, by way of example without limitation, eight locking projections 162 are provided that correspond with eight splines 108 of the barrel nut 102, and eight locking grooves 164 are provided that correspond with eight channels 110 of the barrel nut 102. In at least one embodiment, the number of locking projections 162 (or the number of locking grooves 164) is smaller than the number of the channels 110 (or the number of the splines 108) of the barrel nut 102.

In at least one embodiment, the radial centerlines of the locking projections 162 are angularly arranged at an angle A2 (e.g., 45 degrees) from each other. Similarly, the radial centerlines of the locking grooves 164 are angularly arranged at the same angle A2 from each other. The locking projections 162 and the locking grooves 164 are arranged so that a pair of the locking projections 162, which are opposed to each other with respect to the center C, has its radial centerline that is aligned with the tool axis $A_T$.

The barrel nut position indicating portion 146 includes a final position indicator 168. In at least one embodiment, the barrel nut position indicating portion 146 optionally includes a pre-tensioned position indicator 170. The final position indicator 168 is configured to determine that the barrel nut 102 is properly aligned with the upper receiver 48. The pre-tensioned position indicator 170 is configured to indicate that a proper barrel nut spacer or a proper set of barrel nut spacers are inserted between the barrel nut 102 and the upper receiver 48 and that the barrel nut 102 is ready to be further tightened against the upper receiver 48 to provide proper alignment and tension between the barrel nut 102 and the upper receiver 48. The geometry of the final position indicator 168 and the pre-tensioned position indicator 170 are described below with reference to FIG. 15.

In the depicted example, the indicators 168 and 170 are arranged on the outer surface 156 of the head portion 142 and integrally formed with the head portion 142. The indicators 168 and 170 can be of any type. Examples of the indicators 168 and 170 include, but are not limited to, projections, notches, numbers, colors, letter descriptions and riveted surfaces with graduations. In at least one embodiment, the indicators 168 and 170 have thread shapes or tipped shapes. In at least one embodiment, the indicators 168 and 170 are of different types, such as but not limited to, color indexes or marks arranged on the outer surface 156 or the side surface 158 of the head portion 142. In at least one embodiment, the indicators 168 and 170 are formed as notches on the outer surface 156 of the head portion 142.

In at least one embodiment, the pre-tensioned position indicator 170 is formed as a plateau portion having a first end 172 and a second end 174 for providing an acceptable range in which the barrel nut 102 is ready to be further screwed into the upper receiver 48 until the final position indicator 168 substantially indicates a reference point or line 186 (FIG. 17) of the upper receiver 48. As described below, the first and second ends 172 and 174 of the pre-tensioned position indicator 170 are used to represent a range of torque or tension applied between the barrel nut 102 and the upper receiver 48 before the barrel nut 102 is further tightened against the upper receiver 48, and to determine whether the reference line 186 of the upper receiver 48 is aligned with the pre-tensioned position indicator 170.

Further, the barrel nut spacer selection portion 148 includes one or more barrel nut spacer selection indicators for indicating a barrel nut spacer or a set of barrel nut spacers required to be interposed between the barrel nut 102 and the upper receiver 48 to provide an appropriate spacing between the barrel nut 102 and the upper receiver 48 when the barrel nut 102 is fastened to the upper receiver 48. In at least one embodiment, the barrel nut spacer selection portion 148 is arranged on the outer surface 156 of the head portion 142 adjacent the barrel nut position indicating portion 146, and spaced apart from the barrel nut position indicating portion 146 in a clockwise direction when viewed in FIG. 14. In at least one embodiment, the barrel nut spacer selection portion 148 has 2 to 10 barrel nut spacer selection indicators. In this example, the barrel nut spacer selection portion 148 includes five barrel nut spacer selection indicators 176, 178, 180, 182, and 184. The geometry of the barrel nut spacer selection indicators 176, 178, 180, 182, and 184 is described below with reference to FIG. 15.

The indicators of the barrel nut spacer selection portion 148 can be of any type. Examples of the indicators include, but are not limited to, projections, notches, riveted surfaces with graduations, numbers, colors, and letter descriptions. In at least one embodiment, the indicators of the barrel nut spacer selection portion 148 are integrally formed with the head portion 142, and have thread shapes or tipped shapes. In at least one embodiment, the indicators are of different types, such as but not limited to, color marks or indexes arranged on the outer surface 156 or the side surface 158 of the head portion 142. In at least one embodiment, the indicators are formed as notches on the outer surface 156 of the head portion 142.

In at least one embodiment, each of the barrel nut spacer selection indicators represents a barrel nut spacer or a set of barrel nut spacers required to be interposed between the barrel nut 102 and the upper receiver 48. In this embodiment, only by way of example, the first barrel nut spacer selection indicator 176 represents a combination of the second barrel nut spacer 118 and the fourth barrel nut spacer 122. The second barrel nut spacer selection indicator 178 represents a combination of the third barrel nut spacer 120 and the fourth barrel nut spacer 122. The third barrel nut spacer selection indicator 180 represents a combination of the first barrel nut spacer 116 and the fifth barrel nut spacer 124. The fourth barrel nut spacer selection indicator 182 represents a combination of the second barrel nut spacer 118 and the fifth barrel nut spacer 124. The fifth barrel nut spacer selection indicator 184 represents a set of two first barrel nut spacers 116. As such, a gap of about 6.5 degrees between adjacent barrel nut spacer selection indicators indicates that a barrel nut spacer or a set of barrel nut spacers needs to be interposed between the barrel nut 102 and the upper receiver 48 to provide an additional thickness of 0.01 inch. In at least one embodiment, different geometries are employed for the barrel nut spacer selection indicators and their corresponding sets of barrel nut spacers. In at least one embodiment, a table is provided to indicate one or a set of barrel nut spacers that is represented by each barrel nut spacer selection indicator.

Although the barrel nut spacer selection portion 148 is described herein with five barrel nut spacer selection indicators, the barrel nut spacer selection portion 148 can include any suitable number of barrel nut spacer selection indicators so long as they are arranged on the head portion 142 in the same geometry as described above.

In at least one embodiment, the barrel installation kit 100 includes a user manual that allows a user to match each barrel nut spacer selection indicator with a barrel nut spacer or a set of barrel nut spacers corresponding to the indicator. In at least one embodiment, a label is attached on the barrel installation tool 106 to explain a barrel nut spacer or a set of barrel nut spacers corresponding to each barrel nut spacer selection indicator.

Figure 15:
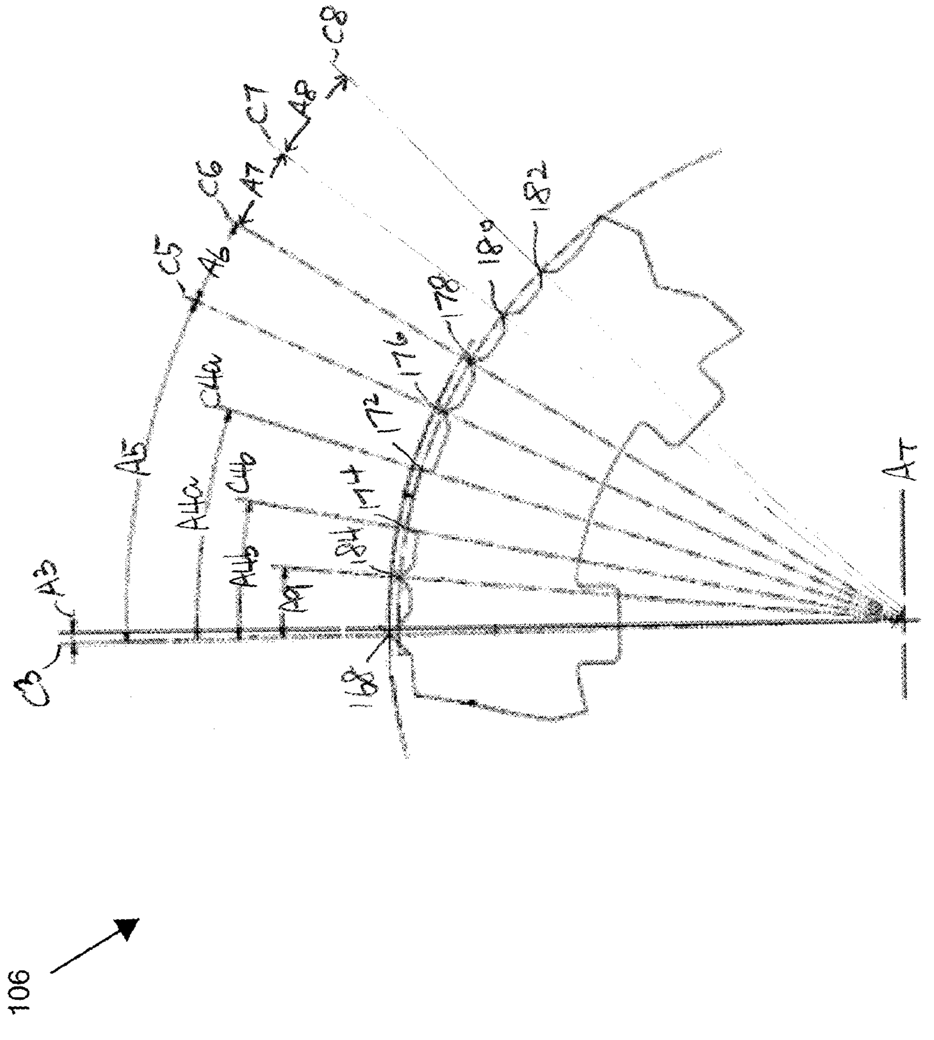
FIG. 15 illustrates an example arrangement of indicators of FIG. 14.

FIG. 15 illustrates an example arrangement of the indicators of the example barrel nut tool 106, shown in FIG. 14. In this example, the indicators 168, 170, 176, 178, 180, 182, and 184 are arranged in a predetermined manner relative to one another.

In at least one embodiment, the final position indicator 168 has a centerline C3 arranged substantially in line with a transverse axis $A_V$, which is perpendicular to the longitudinal tool axis $A_T$. The transverse axis $A_V$ is in line with the radial centerline of another pair of the locking projections 162 of the head portion 142. In at least one embodiment, the centerline C3 of the final position indicator 168 is shifted counterclockwise with angle A3 from the transverse axis $A_V$ as shown in FIG. 14. For example, the angle A3 between the centerline C3 and the radial centerline of the pair of the locking projections 162 is 0.8 degrees.

In this example, the first end 172 has a centerline C4*a* arranged to be shifted clockwise from the final position indicator 168 with an angle of A4*a*, and the second end 174 has a centerline C4*b* arranged to be shifted clockwise from the final position indicator 168 with an angle of A4*b*. In at least one embodiment, the angle A4*a* between the centerlines C3 and C4*a* is 19 degrees, and the angle A4*b* between the centerlines C3 and C4*b* is 12 degrees. In at least one embodiment, the first end 172 of the pre-tensioned position indicator 170 represents a torque or tension of about 50 ft-lbs, and the second end 174 represents a torque or tension of about 80 ft-lbs.

The barrel nut spacer selection indicators 176, 178, 180, 182, and 184 have centerlines C5, C6, C7, C8, and C9, respectively. The centerline C5 of a first barrel nut spacer selection indicator 176 is arranged to be shifted clockwise from the centerline C3 of the final position indicator 168 with an angle A5. The centerline C6 of a second barrel nut spacer selection indicator 178 is arranged to be shifted clockwise from the centerline C5 of the first barrel nut spacer selection indicator 176 with an angle A6. The centerline C7 of a third barrel nut spacer selection indicator 180 is arranged to be shifted clockwise from the centerline C6 of the second barrel nut spacer selection indicator 178 with an angle A7. The centerline C8 of a fourth barrel nut spacer selection indicator 182 is arranged to be shifted clockwise from the centerline C7 of the third barrel nut spacer selection indicator 180 with an angle A8. In this example, the angle A5 between the centerlines C3 and C5 is about 26 degrees. The angles A6, A7, and A8 between the adjacent centerlines C5-C8 are each about 6.5 degrees, respectively. The centerline C9 of a fifth barrel nut spacer selection indicator 184 is arranged to be shifted clockwise from the centerline C3 of the final position indicator 168 with an angle of A9. In this example, the angle A9 is about 6.5 degrees.

Figure 16:
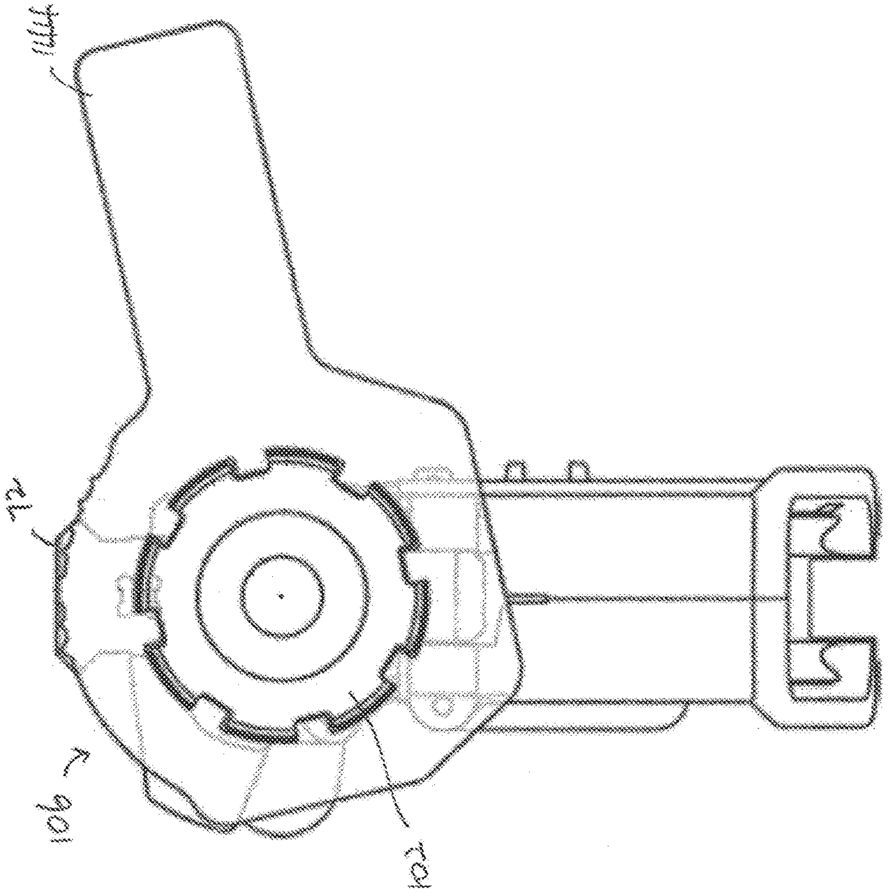
FIG. 16 is a front schematic view of a barrel installation tool engaged with a barrel nut in a first tool position.

FIG. 16 is a front schematic view of the barrel installation tool 106 engaged with the barrel nut 102 in a first tool position as an example of the operation 324. As described above, after the barrel installation tool 106 is inserted over the barrel nut 102, it is determined whether the barrel installation tool 106 is in a first tool position at the operation 324. In at least one embodiment, at the operation 324, a user observes the barrel installation tool 106 engaged with the barrel nut 102 from the front of the firearm 40. The barrel installation tool 106 is in the first tool position when the handle portion 144 is arranged to extend radially outwards between noon and three o'clock position as shown in FIG. 16. In this example, the handle portion 144 is positioned between two and three o'clock in FIG. 16, and thus it is observed that the barrel installation tool 106 is in the first tool position.

If the barrel installation tool 106 is not in the first tool position when engaged with the barrel nut 102, the user removes the barrel installation tool 106 from the barrel nut 102 and inserts the barrel installation tool 106 onto the barrel nut 102 again so that the barrel installation tool 106 is in the first tool position (NO at the operation 324). If it is observed that the barrel installation tool 106 is in the first tool position, the user can proceed to operation 326 (YES at the operation 324).

Figure 17:
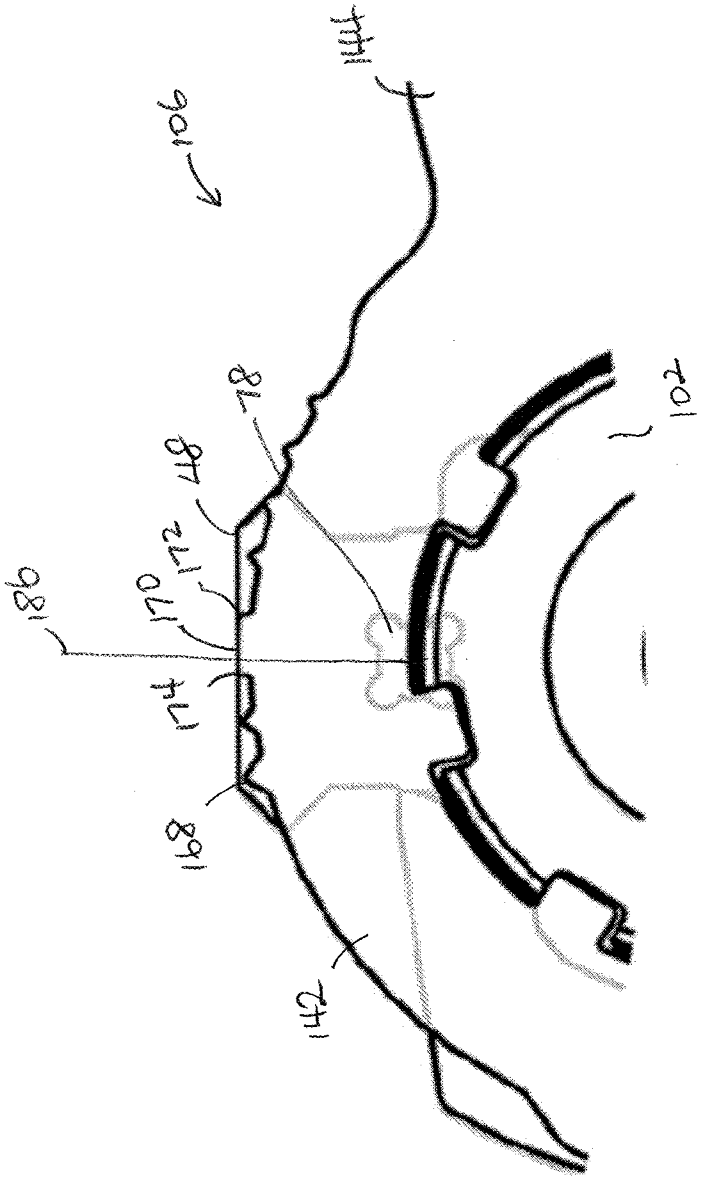
FIG. 17 is a front schematic view of a barrel installation tool engaged with a barrel nut, illustrating an example operation for determining whether a pre-tensioned position indicator is aligned with a reference line of an upper receiver.

FIG. 17 is a front schematic view of a portion of the barrel installation tool 106 engaged with the barrel nut 102, illustrating the optional operation 326 of FIG. 11. As described above, at the operation 326, the user determines whether the pre-tensioned position indicator 170 is aligned with the reference line 186 of the upper receiver 48. As the operation 326 is optional, in at least one embodiment, the process jumps from the operation 324 to the operation 308.

After the barrel nut 102 is tightened against the upper receiver 48 (304) and the barrel installation tool is engaged with the barrel nut 102 (322 and 324), it is observed that the reference line 186 of the upper receiver 48 crosses the plateau portion between the first and second ends 172 and 174 of the pre-tensioned position indicator 170, as depicted in FIG. 17. The reference line 186 operates to provide guidance for determining a position of the barrel installation tool 106 and/or the barrel nut 102 with respect to the upper receiver 48. In at least one embodiment, the reference line 186 is in line with the gas tube hole 78 of the upper receiver 48 and perpendicular to the longitudinal axis $A_F$ of the firearm 40. In at least one embodiment, the reference line 186 is in line with the center of the upper receiver 48. When the reference line 186 is arranged between the first and second ends 172 and 174 of the pre-tensioned position indicator 170 of the barrel installation tool 106 engaged in the first tool position, the barrel nut 102 is in a first barrel nut position in which the barrel nut 102 is appropriately engaged with the upper receiver 48 so that the user can further tighten the barrel nut 102 against the upper receiver 48 until the final position indicator 168 is aligned with the reference line 186, as described below. If the first set of barrel nut spacers 126 has been interposed between the barrel nut 102 and the upper receiver 48 at the operation 304, the barrel nut 102 being in the first barrel nut position represents that the first set of barrel nut spacers 126 is properly engaged to provide an appropriate space between the barrel nut 102 and the upper receiver 48 when the barrel nut 102 is finally tightened up against the upper receiver 48.

If the pre-tensioned position indicator 170 is observed to be substantially aligned with the reference line 186, the user proceeds to operation 310 (YES at the operation 326). The operation 310 is described below with reference to FIG. 23.

If the pre-tensioned position indicator 170 is not substantially aligned with the reference line 186, the user proceeds to operation 308 (NO at the operation 326). Referring to FIG. 4, at the operation 308, the user identifies and installs one or more barrel nut spacers selected from the group of barrel nut spacers 104.

Figure 18:
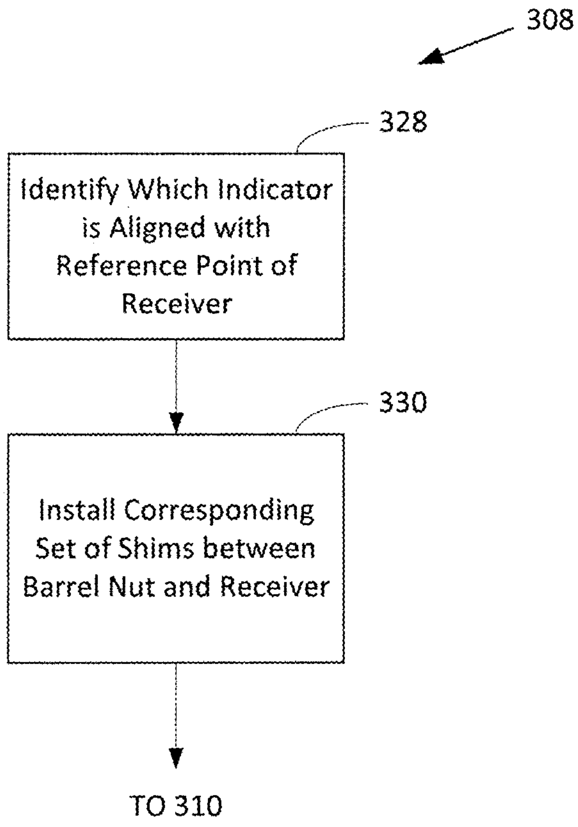
FIG. 18 is a flowchart illustrating an example method of identifying and installing one or more barrel nut spacers.

FIG. 18 is a flowchart illustrating an example method of identifying and installing one or more barrel nut spacers. In at least one embodiment, the method is an example of the operation 308 of FIG. 4. In at least one embodiment, the operation 308 includes identifying which barrel nut spacer selection indicator is aligned with the reference line 186 of the upper receiver 48 (operation 328); and installing a selected barrel nut spacer or a selected set of barrel nut spacers between the barrel nut 102 and the upper receiver 48 (operation 330). The operation 328 is described with reference to FIG. 19. The operation 330 is described with reference to FIGS. 20-22.

Figure 19:
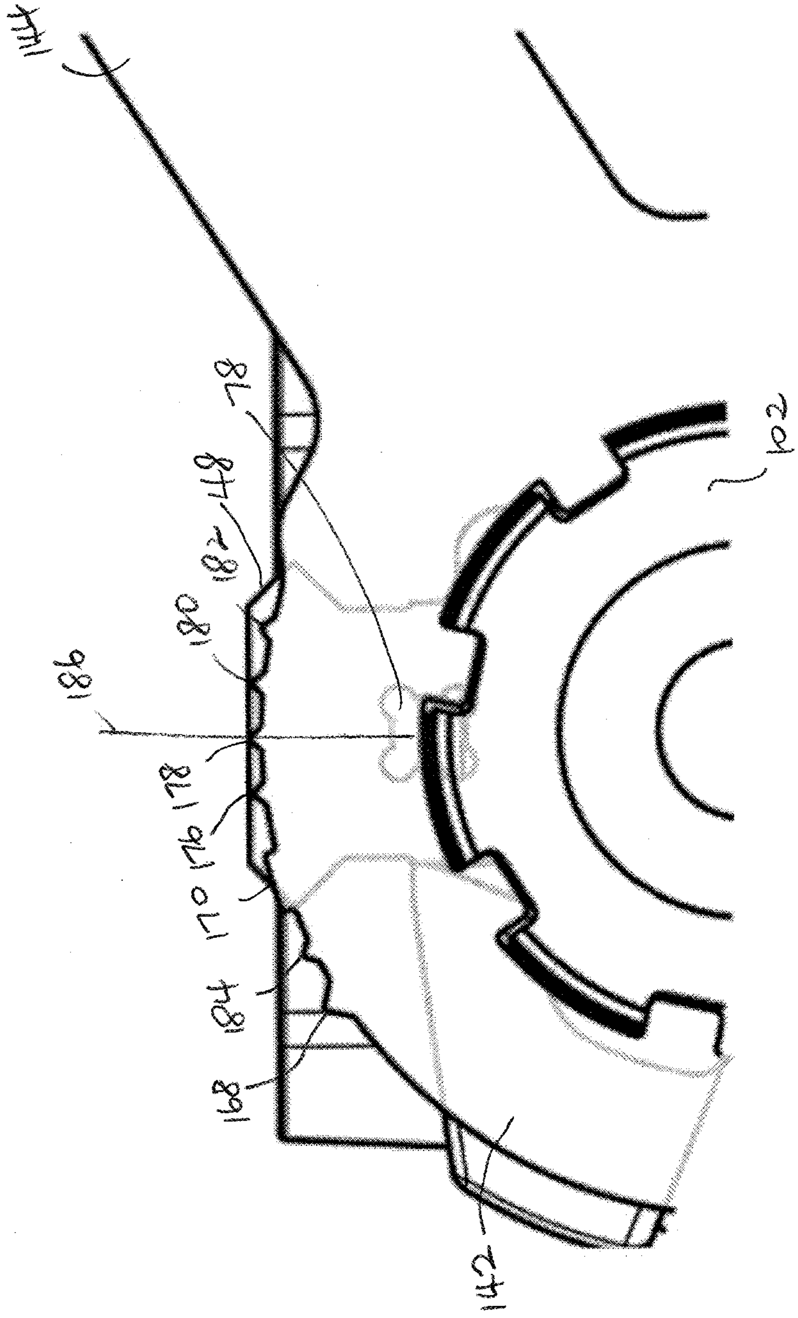
FIG. 19 is a front schematic view of a barrel installation tool engaged with a barrel nut, illustrating an example operation of identifying an indicator aligned with a reference line of an upper receiver.

FIG. 19 is a front schematic view of the barrel installation tool 106 engaged with the barrel nut 102, illustrating an example of the operation 328 of FIG. 18. In at least one embodiment, at the operation 332, a user observes and determines which of the barrel nut spacer selection indicators 176, 178, 180, 182, and 184 is most closely aligned with the reference line 186 when viewed from the front of the firearm 40, as depicted in FIG. 19. In this example, the second barrel nut spacer selection indicator 178 is most close to the reference line 186. This represents that the second set of barrel nut spacers 188 (FIG. 22) is required to be interposed to provide spacing between the barrel nut 102 and the upper receiver 48 for proper alignment and tension. In at least one embodiment, the user then refers to the barrel nut spacer selection table 114, such as shown in FIG. 8, and matches the barrel nut spacer selection indicator identified at the operation 332 with a barrel nut spacer selection listed in the table 114 to find a proper set of barrel nut spacers corresponding to the identified barrel nut spacer selection indicator.

After identifying a required set of barrel nut spacers for proper alignment and tension at the operation 328, the user installs the selected set of barrel nut spacers between the barrel nut 102 and the upper receiver 48 at the operation 330.

Figure 20:
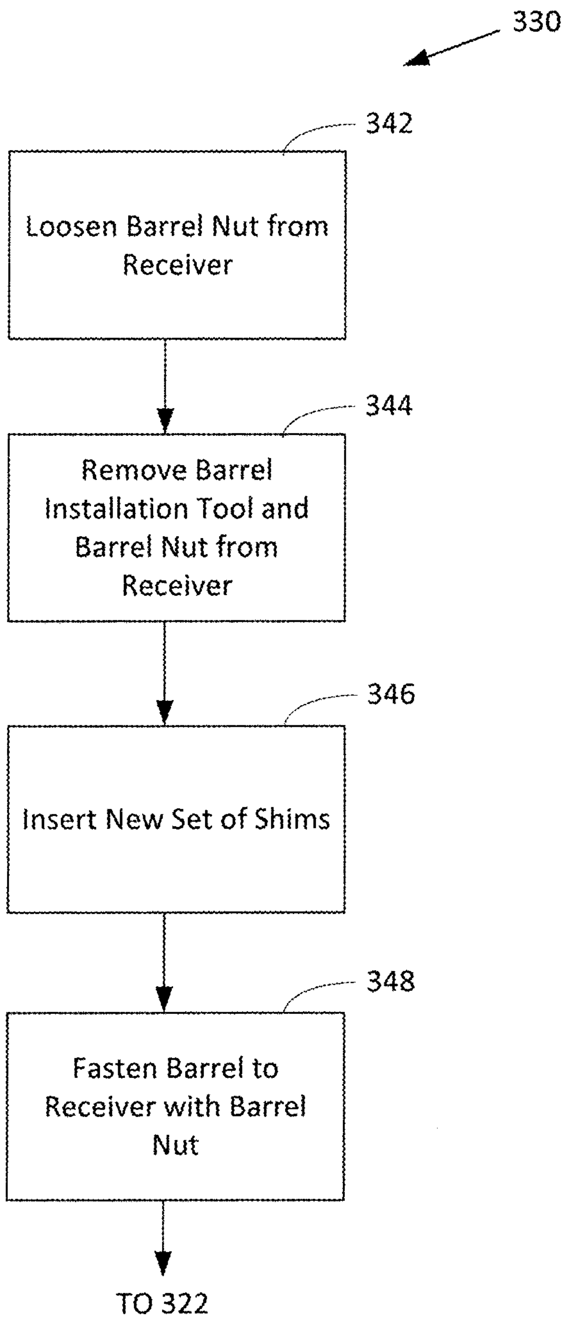
FIG. 20 is a flowchart illustrating an example method of installing corresponding barrel nut spacers between a barrel nut and upper receiver.

FIG. 20 is a flowchart illustrating an example method of installing a corresponding set of barrel nut spacers between the barrel nut and the upper receiver. In at least one embodiment, the method is an example of the operation 330 of FIG. 18. In at least one embodiment, the operation 330 starts with operation 342, in which the user loosens the barrel nut 102 from the upper receiver 48. The barrel nut 102 is unscrewed from the upper receiver 48 either by hand or with the barrel installation tool 106.

Figure 21:
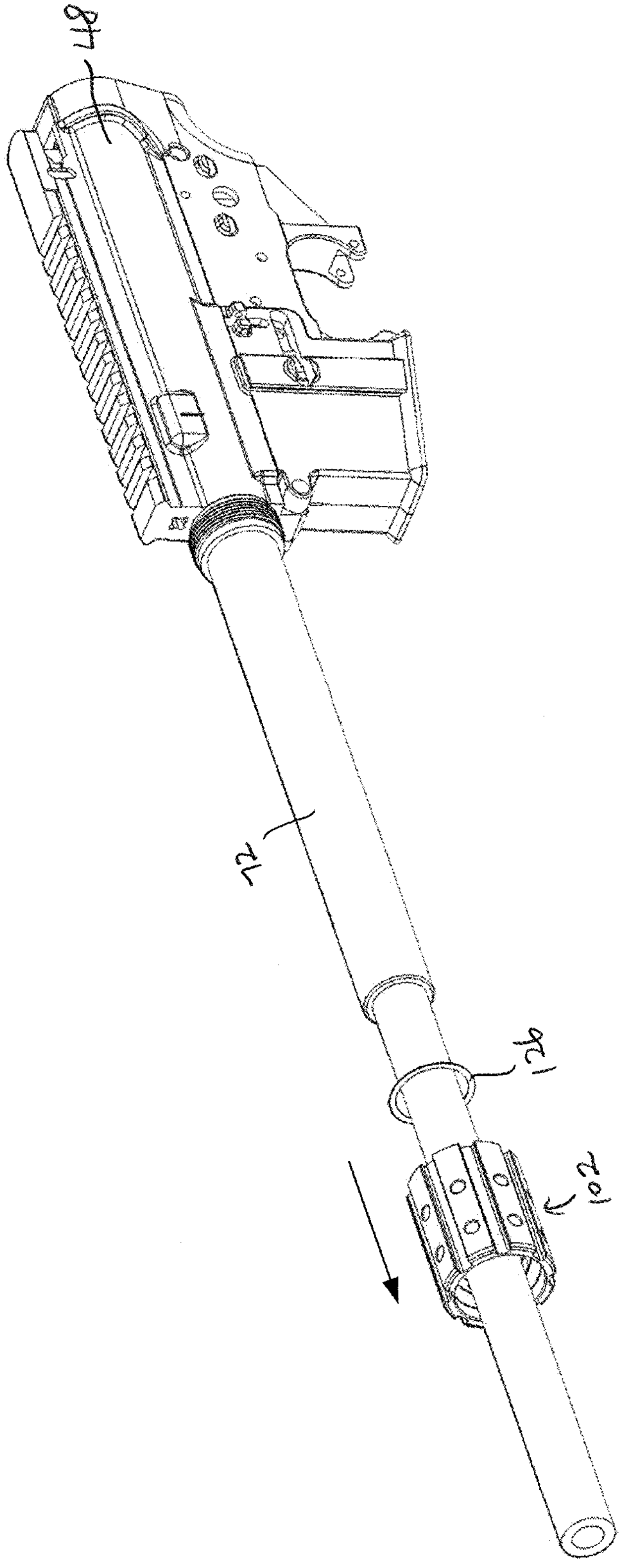
FIG. 21 is a perspective view illustrating an operation of FIG. 20.

FIG. 21 is a perspective view, illustrating an example operation 344 of FIG. 20. Once the barrel nut 102 is loosened (operation 342), the user removes the barrel installation tool 106 from the barrel nut 102 and removes the barrel nut 102 from the upper receiver 48 (operation 344), as shown in FIG. 21. The order of removing the barrel installation tool 106 and the barrel nut 102 does not matter so long as both of the barrel installation tool 106 and the barrel nut 102 are removed for inserting the selected set of barrel nut spacers 188 onto the barrel 72.

Figure 22:
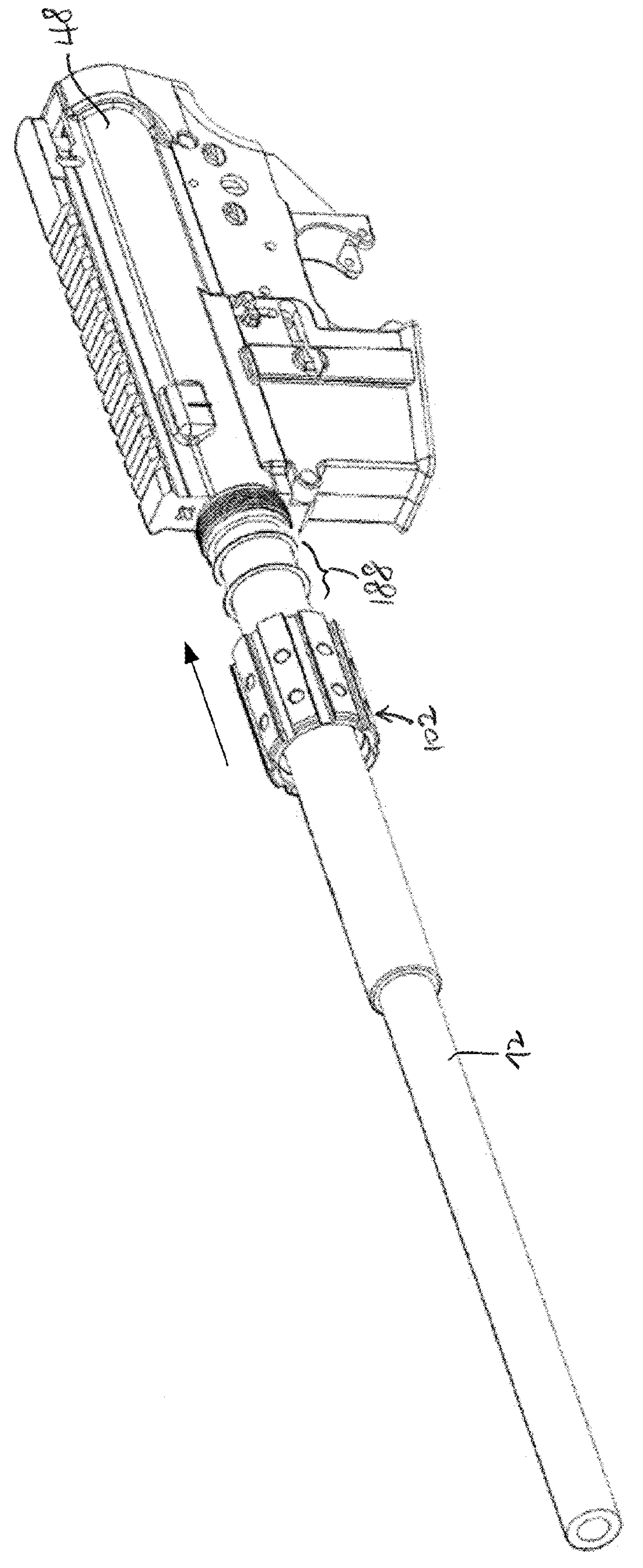
FIG. 22 is a perspective view illustrating another operation of FIG. 20.

FIG. 22 is a perspective view, illustrating example operations 346 and 348 of FIG. 20. In at least one embodiment, at the operation 346, the user inserts the newly selected set of barrel nut spacers 188 onto the barrel 72 and place the set of barrel nut spacers adjacent the engaging flange 90 of the barrel 72. Then, the user fastens the barrel 72 to the upper receiver 48 with the barrel nut 102 at the operation 348. The operation 348 is substantially the same as the operation 306, which is described above and with reference to FIGS. 11-17, and thus the description for the operation 348 is omitted for brevity purposes.

After the operation 348, the user proceeds to the operation 322 and repeats the operations 322, 324, and 326, as shown in FIG. 11. If the user reads and selects the proper set of barrel nut spacers corresponding to the identified barrel nut spacer selection indicator, the pre-tensioned position indicator 170 will be aligned with the reference line 186, and the user can proceed with the operation 310 (YES at the operation 326). If the pre-tensioned position indicator 170 is not substantially aligned with the reference line 186 (NO at the operation 326), the operation 308 (FIG. 18), which includes the operations 342, 344, 346, and 348 (FIG. 20), is repeated until the pre-tensioned position indicator 170 is aligned with the reference line 186.

Figure 23:
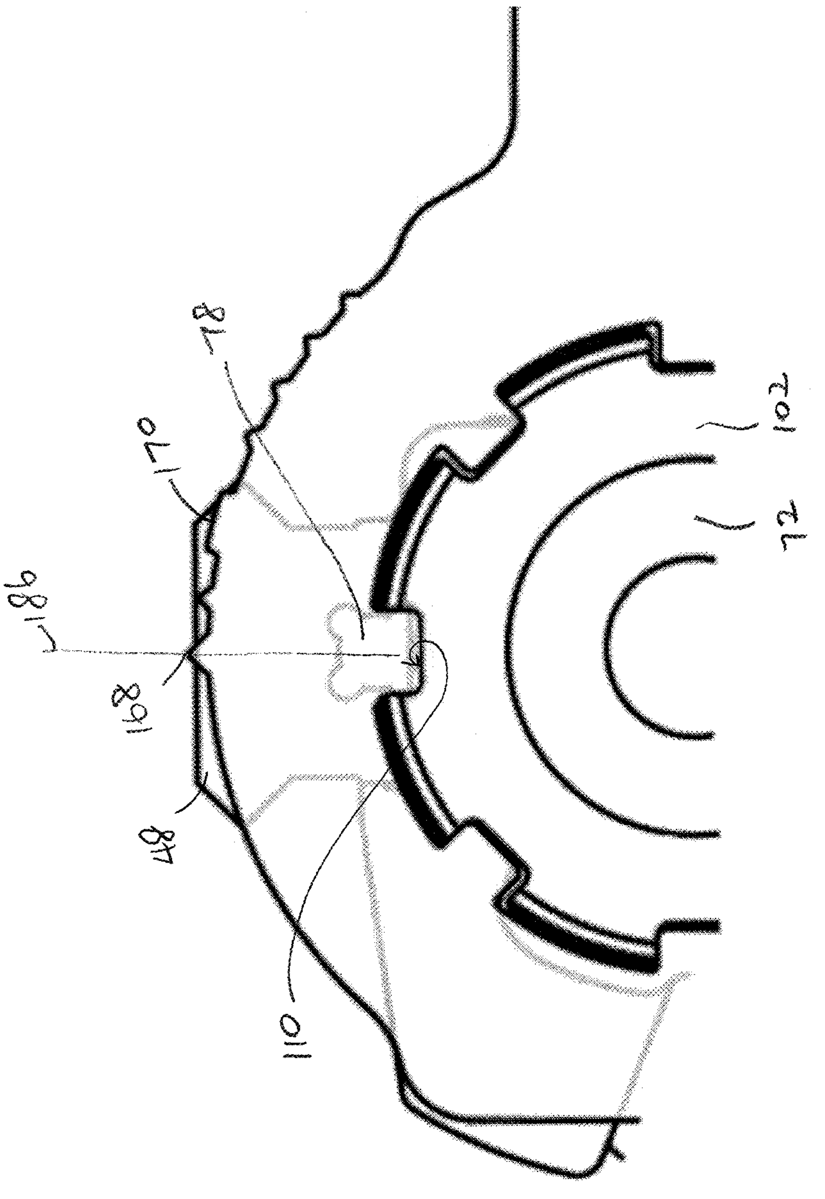
FIG. 23 is a front schematic view of a barrel installation tool engaged with a barrel nut, illustrating an example operation of tightening the barrel nut in a second barrel nut position.

FIG. 23 is a front schematic view of the barrel installation tool 106 engaged with the barrel nut 102, illustrating an example of the operation 310 of FIG. 4. In at least one embodiment, at the operation 326, if the pre-tensioned position indicator 170 is aligned with the reference line 186, the user can proceed with the operation 310. Referring to FIG. 4, at the operation 310, the user tightens the barrel nut 102 to a second barrel nut position thereof. The barrel nut 102 is in the second barrel nut position when the barrel 72 is tightened against the upper receiver 48 with the barrel nut 102 so as to provide proper tension and alignment appropriate for installation of the gas tube 76. FIG. 23 shows that the barrel nut 102 is in the second barrel nut position. As shown in FIG. 23, the gas tube hole 78 is aligned with one of the channels 110 of the barrel nut 102 so that a portion of the gas tube 76 is nested onto the channel 110 and inserted into the gas tube hole 78.

At the operation 310, the user applies force to the barrel installation tool 106 to rotate the barrel nut 102 until the final position indicator 168 of the barrel installation tool 106 is aligned with the reference line 186. In at least one embodiment, it can be very difficult to tighten the barrel nut 102 with the barrel installation tool 106 by hand from the first barrel nut position (in which the pre-tensioned position indicator 170 is aligned with the reference line 186) to the second barrel nut position (in which the pre-tensioned position indicator 170 is aligned with the reference line 186). In this case, a torque applying tool of any type can be employed to ease rotation of the barrel nut 102. In at least one embodiment, a piece of pipe that is suitable for inserting the handle portion 144 of the barrel installation tool 106 is employed for providing additional leverage to the barrel installation tool 106.

Once the barrel nut 102 is tightened against the upper receiver 48 until the final position indicator 168 is aligned with the reference line 186 at the operation 310, the user can install the gas tube 76 between the gas block 74 and the gas tube hole 78 of the upper receiver 48. After the gas tube 76 is installed, a bolt carrier assembly can be installed within the upper receiver 48. Further, the user can insert the handguard 60 over the barrel 72 and slides the handguard 60 onto the barrel nut 102 while the gas tube 76 is aligned with the gas tube slot 68 (FIG. 1) of the handguard 60. In at least one embodiment, the barrel nut 102 and the handguard 60 are configured to be engaged with a close fit. When the handguard 60 is installed onto the barrel nut 102, the through-holes 66 of the handguard 60 and the threaded holes 112 of the barrel nut 102 are aligned with each other so that screws can be inserted through the through-holes 66 and the threaded holes 112 to fasten the handguard 60 to the barrel nut 102.

Figure 24:
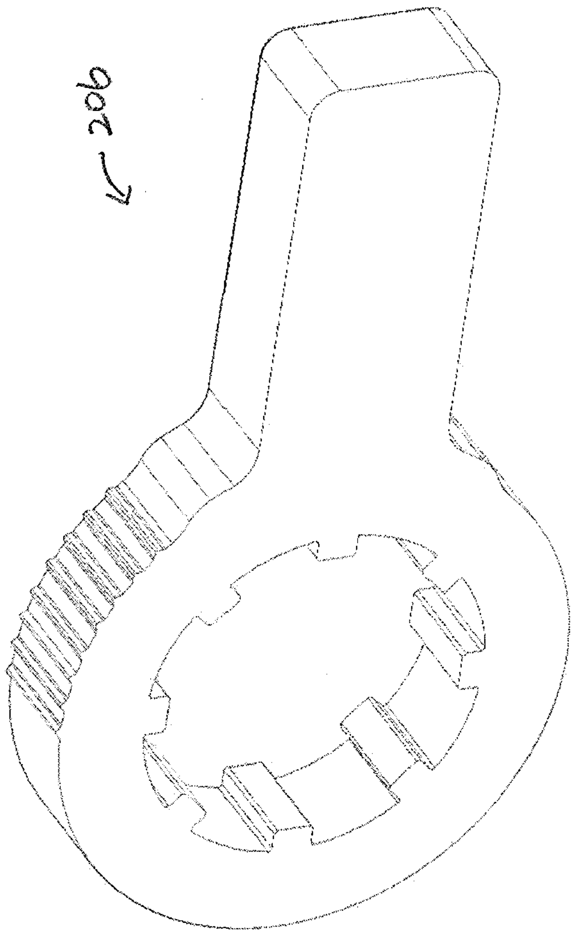
FIG. 24 is a perspective view of another example of a barrel installation tool.

FIG. 24 is a perspective view of another example of a barrel installation tool 206 according to the principles of the present disclosure. The barrel installation tool 206 is similar to the barrel installation tool 106 shown in FIG. 13, except that the barrel installation tool 206 does not include the flat bottom and side portions 150 and 152 of the barrel installation tool 106. Additional features of the barrel installation tool 206 are described herein with reference to the barrel installation tool 106 shown in FIGS. 13-23.

Figure 25:
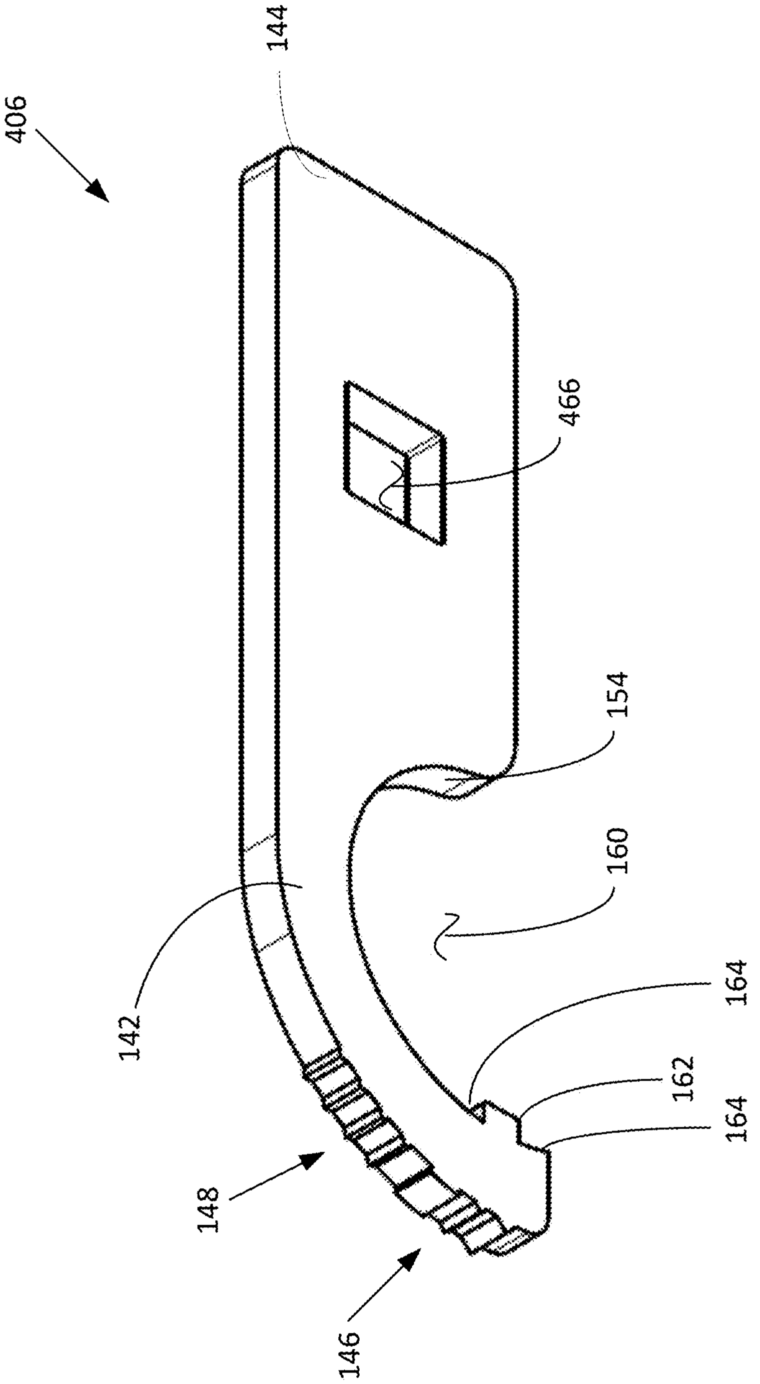
FIG. 25 is a perspective view of another example of a barrel installation tool.

FIG. 25 is a perspective view of another example of a barrel installation tool 406. The barrel installation tool 406 operates similar to the barrel installation tool 106 shown in FIG. 13, except for several notable differences discussed below. In this example, the head portion 142 has an arc or semi-circular shape. In at least one embodiments, the head portion 142 has one locking projection 162 configured to engage and interlock with the tool locking portion 132 of the barrel nut 102. For example, the locking projection 162 is configured to engage one of the channels 110 formed on the barrel nut 102. A portion of the inner surface 154 of the receiving bore 160, which is adjacent the locking projection 162, forms the locking grooves 162 that are engaged with the splines 108 of the barrel nut 102. In at least one other embodiment, the head portion 142 has a plurality of locking projections 162 and corresponding locking grooves 162 formed on the inner surface 154 of the head portion 142.

Similar to the first example of the barrel installation tool 106, the head portion 142 includes the barrel nut position indication portion 146 and the barrel nut spacer selection portion 148, which are arranged on a portion of the outer surface 156 of the head portion 142. As discussed above, the barrel nut position indication portion 146 and the barrel nut spacer selection portion 148 can include various configurations in various possible embodiments, such as projections, notches, riveted surfaces with graduations, numbers, colors, and letter descriptions.

In this example, the handle portion 144 includes a tool engaging hole 466. In at least one embodiment, the tool engaging hole 466 is configured to engage a separate tool or instrument suitable for providing additional leverage to the barrel installation tool 106 when rotating the barrel installation tool 106 around the barrel nut 102. Such a tool or instrument has a cross-sectional shape adapted for being engaged and interlocked with the tool engaging hole 466. Further, the tool or instrument has a length sufficient to extend from the handle portion 144 when engaged and interlocked with the tool engaging hole 466, so that a user can easily apply rotational force to the barrel installation tool 106 through the tool or instrument. Examples of such a tool or instrument include a piece of pipe, a metal stick, a square drive of a ratchet, and a breaker bar. For example, the square drive of a ratchet is engaged with the tool engaging hole 446 and provides an extended lever or handle to a user, thereby easing the rotation of the barrel installation tool 106 around the barrel nut 102 with a smaller amount of turning force.

Figure 26:
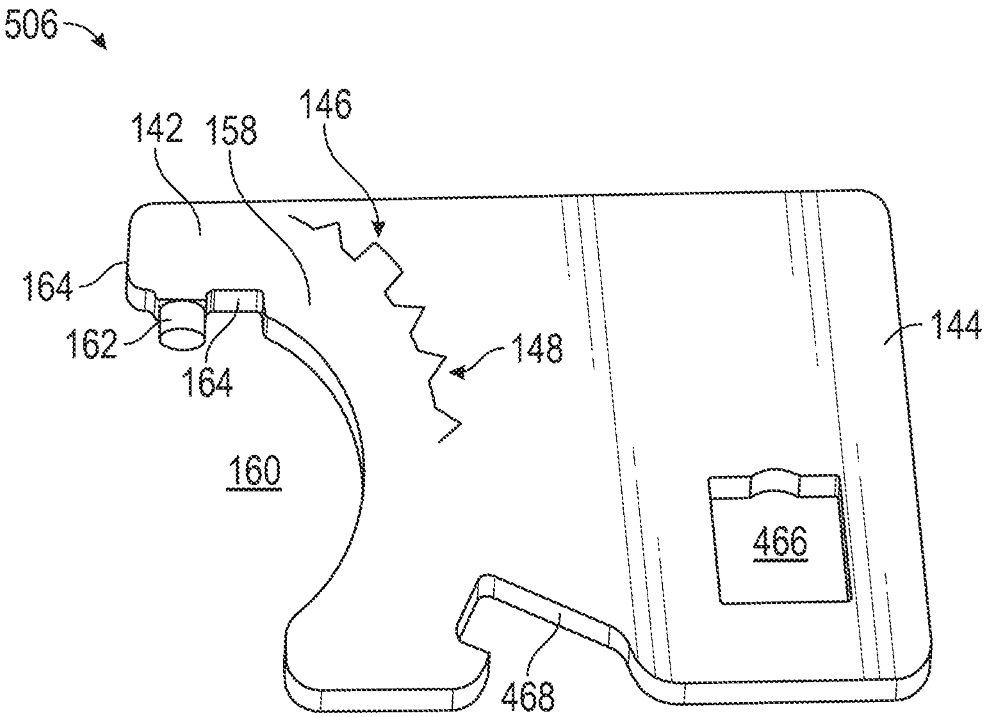
FIG. 26 is a perspective view of another example of a barrel installation tool.

FIG. 26 is a perspective view of another example of a barrel installation tool 506. The barrel installation tool 506 operates similar to the barrel installation tool 106, shown in FIG. 13, except for several notable differences discussed below.

In this example, the head portion 142 has the barrel nut position indication portion 146 and the barrel nut spacer selection portion 148, which are formed as visual indication, such as a painting or marking on the side surface 158 of the head portion 142. Other types of visual indication include numbers, colors, and letter descriptions.

In at least one embodiment, the barrel installation tool 506 further includes accessories. In the depicted example, the barrel installation tool 506 includes a bottle opener 468. In at least one other embodiment, the accessories can be of any type. Some embodiments do not include accessories.

In some embodiments the barrel installation kit 100, including the barrel installation tool 106, eliminates the need to use a torque wrench to install the barrel 72 to the upper receiver 48 with the barrel nut 102. Such a torque wrench can over-rotate or under-rotate the barrel nut against the upper receiver, thereby causing misalignment of barrel assembly components and malfunction of the firearm. On the contrary, a user with the kit 100 need not perform a separate calculation to obtain a proper torque or rotation of the barrel nut for proper installation of the barrel nut 102, in some embodiments.

The barrel installation tool 106 with the barrel nut position indicating portion 146 and the barrel nut spacer selection portion 148 allows a user to quickly and conveniently select a barrel nut spacer or a set of barrel nut spacers appropriate for desired alignment and tension of associated components of the barrel assembly 44. The barrel installation tool 106 removes inaccuracy and inconvenience of a typical barrel nut spacer selection operation, which is performed by trial and error.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of installing a barrel to a receiver of a firearm, the method comprising:
inserting the barrel into the receiver;
fastening the barrel to the receiver with a barrel nut;
engaging a barrel installation tool with the barrel nut so that the barrel installation tool is in a first tool position;
identifying one or more barrel nut spacers via one or more barrel nut spacer selection indicators of the barrel installation tool, wherein each barrel nut spacer selection indicator comprises a visual identifier that matches a visual identifier on at least one of the barrel nut spacers;
installing the identified one or more barrel nut spacers between the barrel and the barrel nut; and
tightening the barrel nut using the barrel installation tool until the barrel installation tool is in a second tool position in which a final position indicator of the barrel installation tool is aligned with a reference point of the receiver to provide a first amount of torque between the barrel nut and the receiver and to align the barrel nut with the receiver.

2. The method of claim 1, further comprising determining that the barrel nut is in a first barrel nut position before tightening the barrel nut using the barrel installation tool until the barrel installation tool is in the second tool position.

3. The method of claim 2, wherein, when the barrel nut is in the first barrel nut position, a pre-tensioned position indicator of the barrel installation tool is aligned with the reference point of the receiver as the barrel installation tool is in the first tool position.

4. The method of claim 1, wherein the one or more barrel nut spacers are selected so that the barrel nut is in a first position when the barrel installation tool is engaged with the barrel nut in the first tool position after fastening the barrel to the receiver with the barrel nut.

5. The method of claim 1, wherein identifying the one or more barrel nut spacers comprises identifying the one or more barrel nut spacer selection indicators being aligned with the reference point of the receiver when the barrel installation tool is in the first tool position.

6. The method of claim 1, wherein installing the identified one or more barrel nut spacers comprises:

inserting the identified one or more barrel nut spacers over the barrel;

inserting the barrel nut over the barrel with the identified one or more barrel nut spacers interposed between the barrel nut and the receiver; and screwing the barrel nut onto the receiver.

7. The method of claim 6 further comprising:

loosening the barrel nut from the receiver; and removing the barrel nut from the receiver.

8. A method of installing a barrel to a receiver of a firearm, the method comprising:

inserting the barrel into the receiver;

fastening the barrel to the receiver with a barrel nut;

engaging a barrel installation tool with the barrel nut so that the barrel installation tool is in a first tool position;

identifying one or more barrel nut spacers via one or more barrel nut spacer selection indicators of the barrel installation tool by matching each barrel nut spacer selection indicator to a visual identifier on at least one of the barrel nut spacers via one or more corresponding instructions;

installing the identified one or more barrel nut spacers between the barrel and the barrel nut; and tightening the barrel nut using the barrel installation tool until the barrel installation tool is in a second tool position in which a final position indicator of the barrel installation tool is aligned with a reference point of the receiver to provide a first amount of torque between the barrel nut and the receiver and to align the barrel nut to the receiver.

9. The method of claim 8, further comprising determining that the barrel nut is in a first barrel nut position before tightening the barrel nut using the barrel installation tool until the barrel installation tool is in the second tool position.

10. The method of claim 9, wherein, when the barrel nut is in the first barrel nut position, a pre-tensioned position indicator of the barrel installation tool is aligned with the reference point of the receiver as the barrel installation tool is in the first tool position.

11. The method of claim 8, wherein the one or more barrel nut spacers are selected so that the barrel nut is in a first position when the barrel installation tool is engaged with the barrel nut in the first tool position after fastening the barrel to the receiver with the barrel nut.

12. The method of claim 8, wherein identifying the one or more barrel nut spacers comprises identifying the one or more barrel nut spacer selection indicators being aligned with the reference point of the receiver when the barrel installation tool is in the first tool position.

13. The method of claim 8, wherein installing the identified one or more barrel nut spacers comprises:

inserting the identified one or more barrel nut spacers over the barrel;

inserting the barrel nut over the barrel with the identified one or more barrel nut spacers interposed between the barrel nut and the receiver; and screwing the barrel nut onto the receiver.

14. The method of claim 8 further comprising:

loosening the barrel nut from the receiver; and removing the barrel nut from the receiver.

* * * * *